US012118576B2

(12) United States Patent
Kopikare et al.

(10) Patent No.: US 12,118,576 B2
(45) Date of Patent: Oct. 15, 2024

(54) DISTRIBUTING ELECTRONIC SURVEYS THROUGH A MESSENGER PLATFORM

(71) Applicant: QUALTRICS, LLC, Provo, UT (US)

(72) Inventors: Milind Kopikare, Draper, UT (US); Jeffrey Scott Whiting, Salem, UT (US); Ayushman Dutta, Seattle, WA (US); Alexia Newgord, Seattle, WA (US)

(73) Assignee: Qualtrics, LLC, Provo, UT (US)

( * ) Notice: Subject to any disclaimer, the term of this patent is extended or adjusted under 35 U.S.C. 154(b) by 196 days.

(21) Appl. No.: 15/648,338

(22) Filed: Jul. 12, 2017

(65) Prior Publication Data

US 2019/0019204 A1 Jan. 17, 2019

(51) Int. Cl.
| | |
|---|---|
| *G06Q 30/0203* | (2023.01) |
| *H04L 9/32* | (2006.01) |
| *H04L 51/04* | (2022.01) |
| *H04L 51/046* | (2022.01) |
| *H04L 51/216* | (2022.01) |
| *H04W 4/02* | (2018.01) |

(52) U.S. Cl.
CPC ......... *G06Q 30/0203* (2013.01); *H04L 9/321* (2013.01); *H04L 51/04* (2013.01); *H04L 51/046* (2013.01); *H04L 51/216* (2022.05); *H04W 4/02* (2013.01)

(58) Field of Classification Search
CPC ....... G06Q 30/02; H04L 51/046; H04L 51/16; H04W 4/02
See application file for complete search history.

(56) References Cited

U.S. PATENT DOCUMENTS

| | | | |
|---|---|---|---|
| 2012/0030301 A1* | 2/2012 | Herold | H04L 12/1818 709/206 |
| 2017/0214757 A1* | 7/2017 | Livingston | G06Q 30/0635 |
| 2018/0212904 A1* | 7/2018 | Smullen | H04L 51/02 |
| 2018/0332167 A1* | 11/2018 | Lu | G06F 16/3322 |

OTHER PUBLICATIONS

C. J. Baby, F. A. Khan and J. N. Swathi, "Home automation using IoT and a chatbot using natural language processing," 2017 Innovations in Power and Advanced Computing Technologies (i-PACT), Vellore, India, 2017, pp. 1-6, doi: 10.1109/IPACT.2017.8245185. (Year: 2017).*

* cited by examiner

*Primary Examiner* — Katherine Kolosowski-Gager
(74) *Attorney, Agent, or Firm* — Keller Preece PLLC

(57) ABSTRACT

The present disclosure is directed toward systems and methods generating a survey response based on an analysis of a communication provided by a user. The systems and methods may include receiving a data package sent in response to detecting a trigger event performed by a user, analyzing the data package to determine a user identification for the user, a user input, or an event type, and based on the analysis of the data package, identifying a first survey inquiry within a first electronic survey. Furthermore, the systems and methods may include formatting the first survey inquiry in an instant messenger format, providing, via an instant messenger platform, the formatted first survey inquiry to an instant messenger communication thread associated with the user, receiving an instant message response, and based on the instant message response, generating a survey response to the first survey inquiry.

20 Claims, 18 Drawing Sheets

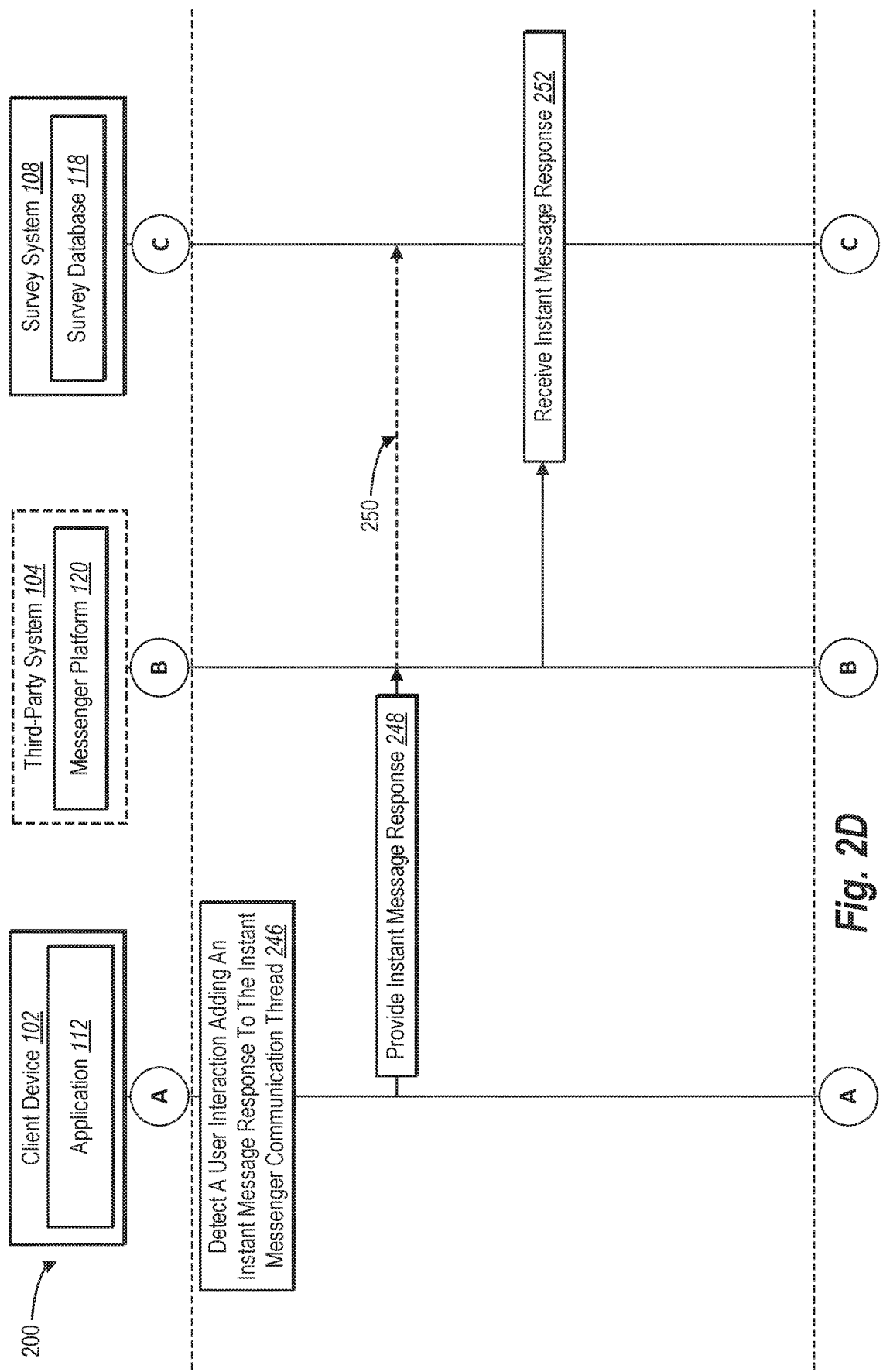

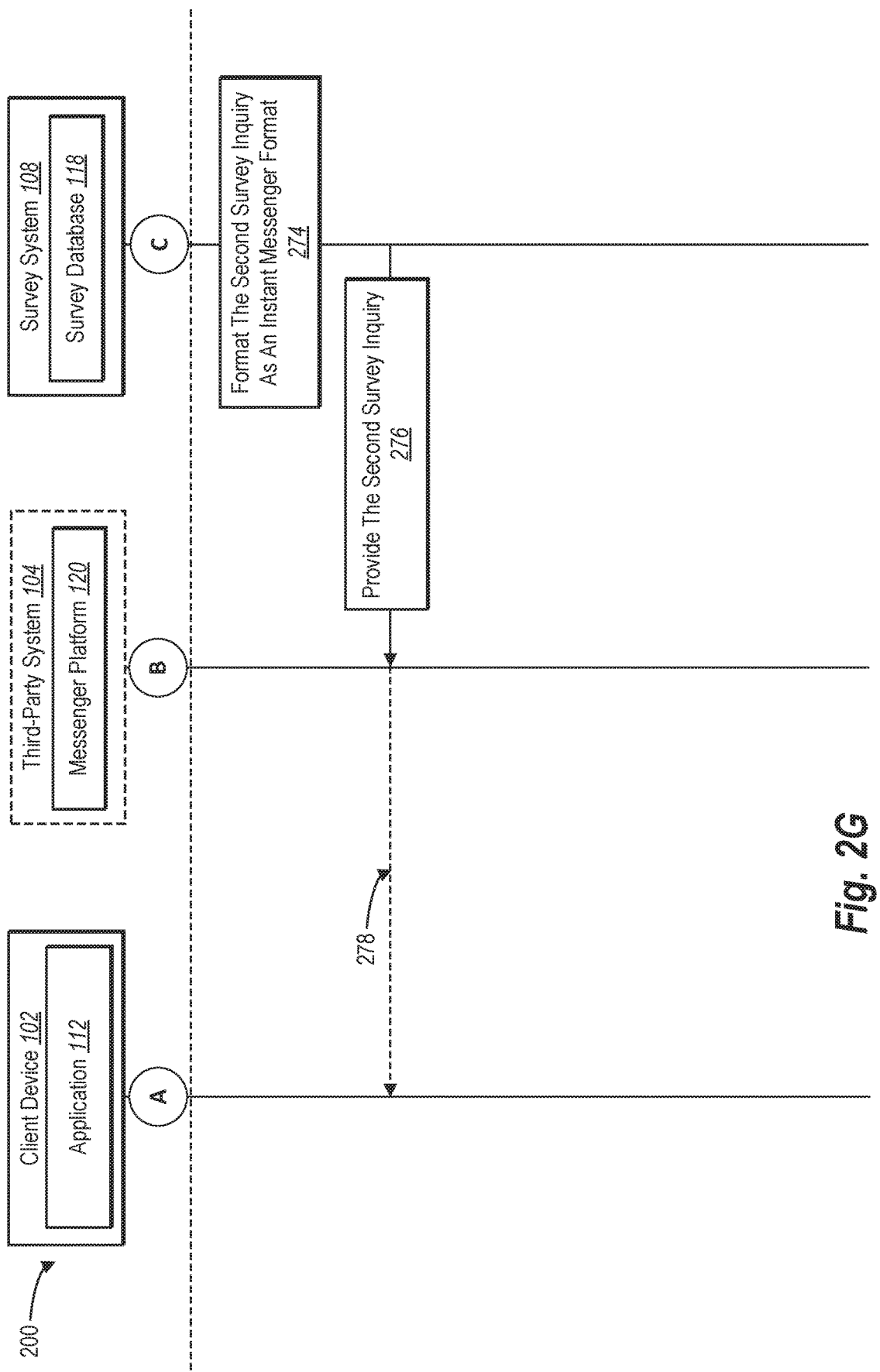

DISTRIBUTING ELECTRONIC SURVEYS THROUGH A MESSENGER PLATFORM

BACKGROUND

Developments in communication technologies have resulted in significant advancements in survey technology, and in particular, have led to the advent of electronic survey systems. To illustrate, a user (e.g., a company) can create an electronic survey by accessing an electronic survey system through a website or online application. The user can further cause the electronic survey system to distribute the electronic survey to a number of potential respondents (e.g., customers) via the Internet. In turn, the respondents can complete the electronic survey online or within an application, for example, and responses to the electronic survey are communicated to the electronic survey system for use by the survey creator.

Although the advent of electronic survey systems has resulted in significant advancements in electronic survey technology, conventional electronic survey systems suffer from a number of problems. One problem with many conventional electronic survey systems is that a respondent often has to take an independent action to access and complete an electronic survey such as selecting a link to be rerouted to a specific website, or entering a survey code within a website. For example, with many conventional electronic survey systems, companies often send invitations to complete electronic surveys via email, and the individual must then independently access and complete the electronic survey online on a separate webpage. Furthermore, inviting individuals to complete electronic surveys via email is often impersonal and disjointed (e.g., lacking a connection between the user and an experience about which the survey concerns).

Based on the above disadvantages, the likelihood that a respondent will choose to respond to a conventional electronic survey invitation is typically low. As a result, data and/or information that conventional electronic surveys acquire may be inaccurate, incomplete, and perhaps not as reflective of a true customer base's opinion. Moreover, to increase the conversion rate of invitations and increase an accuracy of data and/or information acquired through electronic surveys, companies often must incentivize potential respondents (e.g., by offering prizes, money, free products), which in turn increases the expense associated with administering an electronic survey.

Additionally, conventional electronic survey systems send potential respondents electronic survey invitations concerning user experiences with a third-party system (e.g., making a purchase, customer service, etc.). Typically, conventional electronic survey systems send email invitations to the potential respondent well after the experience (e.g., after a purchase). Again, such methods are often ineffective because the invitation reaches the respondent too long after the experience, and a respondent may not remember the experience in sufficient detail to provide meaningful responses to the electronic survey. Furthermore, respondent may not be inclined to take an electronic survey while checking their email for purposes unrelated to the experience (e.g., a user is at work).

An additional problem with conventional electronic survey systems is that context about when and where a respondent participated in an electronic survey, and a user's activities prior to, during, and after participating in the electronic survey, is difficult for conventional electronic systems to obtain. For instance, most conventional electronic survey systems can only obtain such context through specific questions presented in the electronic survey to the respondent. Including questions about such context can result in the electronic surveys being relatively long, and in turn, reduces the likelihood that a respondent will complete the electronic survey. As a result, conventional electronic surveys often sacrifice context in order to increase a likelihood that a respondent will complete an electronic survey.

Another problem with conventional electronic survey systems is that administered electronic surveys are typically web browser and client device specific. In other words, because respondents are typically unwilling to create an account (e.g., user identifier and password) with an electronic survey system just to fill out an electronic survey, respondent typically cannot start an electronic survey on a first client device and finish the electronic survey on another device. Likewise, users typically cannot start an electronic survey within a first web browsing session and finish the electronic survey within another web browsing session unless the user. As a result, distributed electronic surveys are often left unfinished because users close browsing sessions, leave devices, etc., thus, lowering conversion rates.

Conventional electronic survey systems have various additional contextual problems. For example, conventional electronic survey systems are typically unable to collect and provide to an electronic survey administer information about a respondent that chose not to respond to the invitation to take an electronic survey (save that the respondent did not respond). Moreover, conventional electronic survey systems rarely can invite a respondent to take an electronic survey while the respondent is having the experience or immediately after the experience about which the electronic survey is seeking data and/or information.

Accordingly, these and other disadvantages exist with respect to conventional systems and methods for distributing electronic surveys.

SUMMARY

The various embodiments described below provide benefits and/or solve one or more of the foregoing or other problems in the art with systems and methods for providing electronic surveys to user. In particular, the systems and methods provide for distributing electronic surveys through an instant messenger platform. For example, the systems and methods provide for automatically and dynamically distributing an electronic survey to a user during an instant messaging chat session with the user. Accordingly, in some embodiments, the systems and methods provide an electronic survey inquiry (e.g., electronic survey question) to a user within an instant message, and in response, receive an electronic survey response from the user within an instant message. The systems and methods further generate survey responses based on the analyzing the electronic survey response in the instant message, and furthermore, determine an additional electronic survey inquiry to send to the user.

In one or more embodiments, the systems and methods distribute an electronic survey inquiry of an electronic survey in response to a trigger event performed by a user with respect to a third-party system (e.g., the user selected a help option, completed purchase, a submitted complaint, and/or initiated message on the third-party system). In response, the systems and methods identify an electronic survey and/or and electronic survey inquiry to send to the user via an instant messenger platform. Moreover, the systems and methods continue to provide additional survey inquiries in response to receiving instant message responses from the user via the instant messenger platform. Furthermore, based on the instant message responses from the user, the systems and methods generate survey responses by translating or otherwise converting the instant message responses into an electronic survey format that can be associated with the electronic survey.

Accordingly, because the systems and methods administer an electronic survey via a messenger platform in response to a trigger event initiated by the user, the systems and methods provide the electronic survey to a user when the user is more likely interested in providing feedback about an experience. This is because the instant messaging platform allows the electronic survey to be administered to the user while the user is having an experience related to the survey within the third-party system. Moreover, because the systems and methods administer an electronic survey via a messenger platform, the systems and methods provide an electronic survey in a manner and within a format that feels more personal and conversational. Similarly, the user can respond in a more personal and conversational manner in comparison to conventional survey systems, and thus are more likely to respond, and more likely to express their true thoughts and feelings.

Additional features and advantages of the embodiments will be set forth in the description that follows, and in part will be obvious from the description, or may be learned by the practice of such example embodiments. The features and advantages of such embodiments may be realized and obtained by means of the instruments and combinations particularly pointed out in the appended claims. These, and other features, will become more fully apparent from the following description and appended claims, or may be learned by the practice of such example embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments of the invention will be described and explained with additional specificity and detail through the use of the accompanying drawings in which:

FIGS. 2A-2G illustrate a sequence-flow diagram showing an electronic survey system distributing electronic survey inquiries to a client device according to one or more embodiments of the present disclosure;

DETAILED DESCRIPTION

Figure 1:
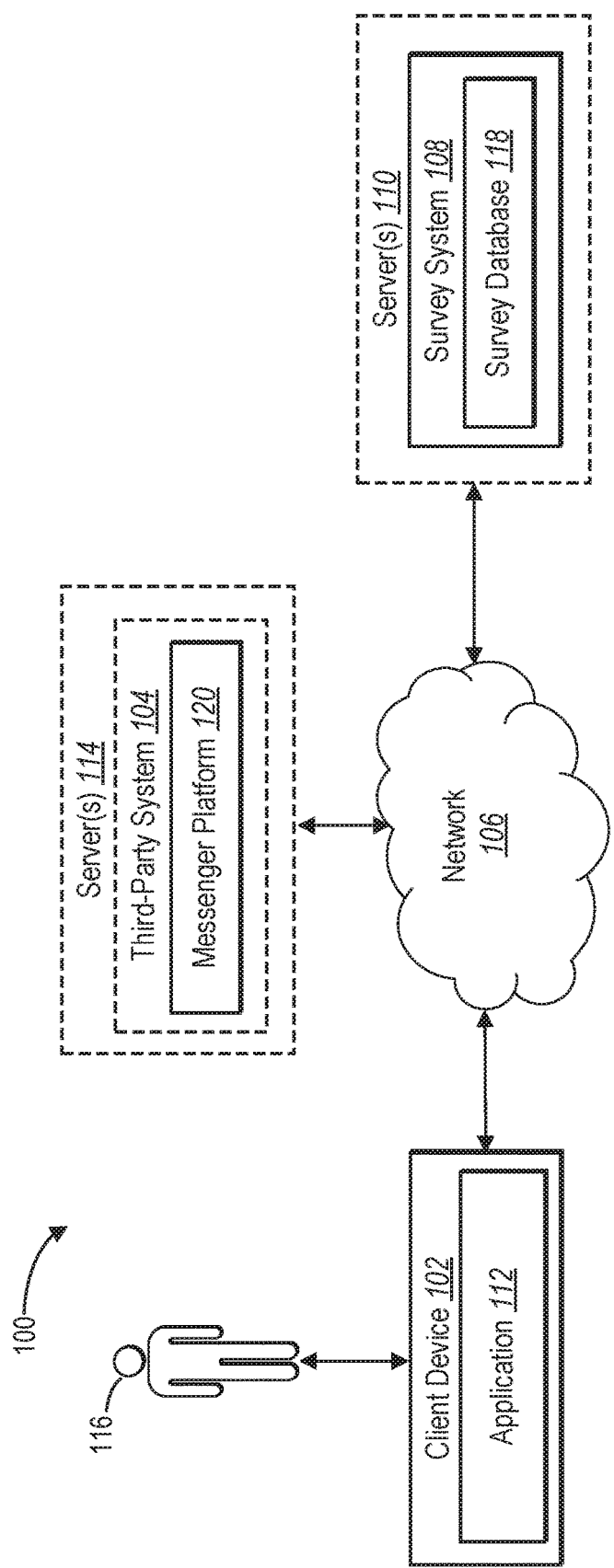
FIG. 1 illustrates a schematic diagram of a communication system according to one or more embodiments of the present disclosure.

Embodiments of the present disclosure include an electronic survey system for distributing electronic surveys through a messenger platform (e.g., an instant messenger platform). For example, the electronic survey system provides a survey inquiry in the form of an instant message for presentation within an instant messenger communication thread associated with the user. In some embodiments, the electronic survey system converts the survey inquiry from an electronic survey format of the electronic survey system to an instant messenger format of the messenger platform. In response to sending the survey inquiry in an instant message to the user, the electronic survey system can receive an instant message response based on user input the user provides within an instant messenger communication thread. Furthermore, in some instances, the electronic survey system can analyze the instant message response received from a user in response to a survey inquiry to generate a survey response to the survey inquiry. The survey response is then associated with the corresponding electronic survey within a survey data base within the electronic survey system.

Because the survey system provides survey inquiries via a messenger platform, the survey system is more likely to successfully invite the user to participate in an electronic survey. For example, the electronic survey system provides a survey inquiry to a user in response to a trigger event, such as the user initiating a chat session with customer service or the user purchasing a product on a third-party website. Accordingly, the survey system increases the likelihood that a user will respond to the survey inquiry because the survey system surfaces the survey inquiry in the moment that the user is having an experience, or just had an experience. In this moment, the user is likely more interested and willing to provide feedback because the survey inquiry is directly related to an ongoing or recent experience of the user. As a result, the survey system can increase survey invitation conversion rates as compared to conventional survey systems.

Furthermore, in the various embodiments in which the survey system sends a survey inquiry in response to a trigger event initiated first by a user, the survey system can offer a survey inquiry in a less intrusive manner, which can produce more candid responses from the user, and thus more representative survey response data (e.g., higher quality data). Moreover, due to providing survey inquiries via a messenger platform, the survey system administers an electronic survey that feels more personal and conversational to the user, while also enabling the user to respond in a more personal and conversational manner in comparison to conventional survey systems. Thus, the survey system of the present disclosure provides survey inquiries to user within a more personal and comfortable environment in comparison to conventional survey systems.

In order to provide the above advantages, the survey system can convert electronic survey inquiries into a format that is more conversational than the sometimes formal language of survey inquiries. For instance, the survey system can extract key words from trigger event information and/or an instant message response from a user, and incorporate the key words into a subsequent survey inquiry. Additionally, the survey system can use a natural language processing (NLP) to match a conversational form normally employed within a chat session. Moreover, in some instances a survey inquiry format within the survey system can be a format traditionally used in other distribution channels (e.g., a multiple-choice question presented via a website interface), and the survey system can convert that format into a survey inquiry or inquiries that results in obtaining a response to the multiple-choice question, as will be explained in detail below.

Similarly, the survey system can analyze instant message responses received from users to determine meanings (e.g., sentiments) derived from an analysis of one or more keywords of the instant message responses. For example, the survey system can utilize an NLP system for processing and deriving meaning from human and/or natural language input, such as text input by a user within an instant message. In particular, the survey system can determine a sentiment associated with an instant message response based on a key word analysis (e.g., an attitude, a feeling, and/or emotion expressed in the trigger event). For example, the survey system can determine whether the key words indicate that the user is happy, sad, angry, upset, satisfied, etc. Furthermore, in some embodiments, the survey system presents determined sentiments within a user interface (e.g., a dashboard application) the survey system provides. In one or more embodiments, the survey system presents the determined sentiments along with other runtime results (e.g., detected keywords, determined locations associated with the instant message response, and/or determined times associated with the instant message response) within the user interface.

In one or more embodiments, based on an analysis of an instant message response from a user, the survey system can select or customize survey inquiries to address the detected meanings/sentiments within the instant message response. For example, if the survey system determines that a user is excited about a product, the survey system can select a survey inquiry that quickly enables the user to purchase the product, review the product, etc. In other instances, the survey system can select/customize survey inquiries to provide customer service within a third-party system (e.g., hyperlinks to products, answers to a user's questions, hyperlinks to help content pages) for the third-party system.

Additionally, in some embodiments, the survey system analyzes the trigger events and instant message responses received from a user to determine contextual information associated with a user who provides or doesn't provide an instant message response to a survey inquiry. For example, the survey system can determine a geolocation and/or time associated with a trigger event and/or instant message response received from the user. Additionally, via the messenger platform, the survey system can acquire other contextual information about the user such as, for example, a name, profile, local, time zone, gender, etc.

Accordingly, and based on the contextual information, the survey system may provide context in regard to a response. Significantly the survey system may provide context in regard to a lack of a response. For example, the survey system of the present disclosure may provide geolocation context within a generated survey response whether or not a potential user chooses to respond to a survey inquiry based on the contextual information available via the messenger platform. As a result, the survey system can determine geolocations where a user is more likely to provide an instant message response. Likewise, the survey system can determine times (i.e., times of day) that a user is more likely to provide an instant message response. Moreover, the survey system can avoid providing survey inquiries about contextual information that the survey system has already acquired.

Furthermore, because the survey system utilizes a messenger platform to administer survey inquiries, administration of an electronic survey can be client device and/or browsing session agnostic. For example, the survey system can associate the electronic survey with a user identifier of the messenger platform. As a result, an instant message session of the messenger platform can be active across multiple devices and can be accessible during different browsing sessions. Accordingly, the survey system enables electronic surveys to be administered across multiple devices and browsing sessions. Thus, the survey system is advantageous over conventional survey systems, which are typically browsing session specific, and as a result, are client device specific. These and other features and advantages of example survey systems according to the principles disclosed herein will be discussed in more detail below with respect to the figures.

Furthermore, the survey system results in improvements of the performance of a computer system. For example, because the survey system only requires a messenger platform instead of a full webpage/website and a click through process to administer the survey inquiry, the survey system reduces required processing power, memory, etc. For example, a user need not download a specific application or open additional web pages to provide responses. Rather, the survey process can be performed via the messenger platform (e.g., a chat session of a web browser or a messaging application. Therefore, the survey system reduces required processing power, memory, and communication resources needed to facilitate survey administering processes.

Moreover, the survey system results in less data transfer and data bandwidth usage for a computer/communication system. Because the survey system is better able to administer an electronic survey to an interested user, thus avoiding the need to utilize a "shot gun" approach to attempt to gather a useful amount of survey responses. In addition, the survey system of the present disclosure, in comparison to conventional systems, is a more efficient system with specific respect to mobile devices. Due to the decreased amount of required processing power and communication bandwidth, the survey system improves the efficiency of administering an electronic survey via mobile or wearable devices such as, for example, electronic personal assistants (e.g., SIRI, GOOGLE NOW, ECHO, etc.), smart watches, and push notifications.

As used herein, the term "electronic survey" (or simply "survey") refers to an electronic communication used to collect information. For example, an electronic survey may include an electronic communication in the form of a poll, questionnaire, census, or other type of sampling. Furthermore, the electronic survey can include one or more survey inquiries (e.g., survey questions). In one or more embodiments, an electronic survey query is stored within an electronic survey system as an organized data table that includes one or more survey inquiries, survey response options associated with each survey inquiry, and survey responses from users. The survey system can communicate, to a client device of a user, the complete version of an electronic survey, a portion of an electronic survey, a survey query within the electronic survey, depending on a particular embodiment. The survey system can perform searches, analysis, and additional actions with respect to the survey responses within an electronic survey to generate and present survey results corresponding to an electronic survey to a survey administrator (e.g., an entity that creates and manages an electronic survey). As used herein, the term "user" refers to a person who participates in, and responds to, an electronic survey.

As used herein, the term "survey inquiry" and any derivative terms refer to an electronic communication sent from the survey system to a user that requests a response from a user. In additional embodiments, a survey inquiry can include a question. In further embodiments, a survey inquiry can include a prompt to the user to encourage a response (e.g., an invitation to take an electronic survey). In yet further embodiments, a survey inquiry can include a statement or information that may be relevant to a user (e.g., a survey inquiry may not necessarily include a question). In such a case, a survey inquiry can include information intended to provide customer service, such as an answer to a user's question, a hyperlink to helpful online content, a phone number, or other information.

In some embodiments, a survey inquiry may be associated with a particular electronic survey within the survey system. For instance, an electronic survey may have a survey ID that references a particular database location for the electronic survey. A survey inquiry may be associated with the electronic survey by the survey ID. For instance, a survey inquiry can have an inquiry ID that is associated with the survey ID of the electronic survey.

As will be discussed in detail below, in some embodiments, a survey inquiry is maintained within an electronic survey system in an electronic survey format. An "electronic survey format" is a data format used within the electronic survey system to organize and maintain survey inquiries within the electronic survey system. The electronic survey format can be any data format, or in some embodiments, the electronic survey format is a proprietary format for the electronic survey system. Additionally, the electronic survey system can cause a survey inquiry to be re-formatted for the purpose of delivering the survey inquiry via a particular delivery channel (e.g., webpage, email, SMS, native application, web application, or instant message) or via a particular client device (e.g., laptop, tablet, or mobile smart phone).

As indicated above, the electronic survey system can format a survey inquiry in an instant message format that is compatible with instant message communication. As used herein, the term "instant message" refers to a digital communication within an instant message platform. For example, an instant message can refer to a message sent from the survey system to a chat application running on a user's client device (e.g., SKYPE, YAHOO MESSENGER, IMESSAGE, or any other IM platform, application or system).

In addition, an "instant message format" refers an instant message protocol (e.g., a generic IM protocol, or a specific IM protocol used within a specific IM communication system (e.g., MSNP, RVP, Skype, WMS, XMPP/Jingle, YSSG or other protocols). In addition, an "instant message format" also refers to the presentation of a communication (e.g., the look and feel of a message). For example, an instant message format can refer to language tone, verbiage, sentence length, symbols, grammar, or other language elements that represent a conversational nature of a message. This conversational nature of an instant message may be referred to herein as "natural messenger language." As will be discussed in detail below, various embodiments of the electronic survey system can convert a survey inquiry from an electronic survey format to an instant message format to be both compatible with an IM protocol, as well as have a look and feel of an instant message communication.

FIG. 1 illustrates a schematic diagram of a communication system 100 according to an embodiment of the present disclosure. As shown in FIG. 1, the communication system 100 may include various components for performing the processes and features described herein. For example, the communication system 100 includes at least one client device 102, a third-party system 104 on one or more server(s) 114, a messenger platform 120, and a survey system 108 on one or more server(s) 110, which are communicatively coupled through a network 106.

As illustrated in FIG. 1, a user 116 may interact with the client device 102, for example, to access and/or respond to communication (e.g., survey inquiries) from the survey system 108. The user 116 may be an individual (i.e., human user), a business, a group, or any other entity. Although FIG. 1 illustrates only one user 116, one will understand that the communication system 100 can include a plurality of users 116, with each of the plurality of users 116 interacting with the communication system 100 using a corresponding client device 102. The client device 102 can be any one or more of various types of computing devices. For example, the client device 102 may include a mobile device such as a mobile telephone, a smartphone, a PDA, a tablet, or a laptop, or a non-mobile device such as a desktop, a server, or another type of computing device. Additional details with respect to the client device 102 are discussed below with respect to FIG. 7.

In some embodiments, the client device 102 may include an application 112 for facilitating communication (e.g., receiving and/or sending instant messages) between the user 116 and other parties, such as the third-party system 104, and/or the survey system 108. For example, in some instances, the application 112 can include one or more of an instant messenger application, chat application, text messenger, a web browser, an application specific to the third-party system 104, etc. For instance, in some embodiments, the application 112 may be associated with the messenger platform 120.

In one or more embodiments, the application 112 can be separate from the third-party system 104 and/or the survey system 108 and can be associated with a separate electronic messaging system (e.g., a social networking system). In other embodiments, as illustrated in FIG. 1, the application 112 may be associated with the third-party system 104. In one or more embodiments, the application 112 may allow the client device 102 to directly or indirectly communicate with the third-party system 104 and/or the survey system 108. For example, the application 112 can receive electronic surveys and/or survey inquiries from the third-party system 104 and/or the survey system 108 via the messenger platform 120 (e.g., an instant message that includes a survey inquiry. Furthermore, via the application 112 on the client device 102, the user 116 can provide responses (e.g., an instant message response) to the electronic surveys and/or survey inquiries.

In one or more embodiments, the application 112 can be a native application installed on the client device 102. For example, the application 112 may be a mobile application that installs and runs on a mobile device, such as a smart phone or a tablet. Alternatively, the application 112 can be a desktop application, widget, or other form of a native computer program. Alternatively, the application 112 may be a remote application accessed by the client device 102. For example, the application 112 may be a web application that is executed within a web browser of the client device 102.

In addition, FIG. 1 illustrates the third-party system 104. Generally, the third-party system can provide content, such as online content, with which the user 116 can access using the client device 102. The third-party system 104 can be associated with an entity, such as a company, government agency, merchant, blog, social networking system, or other online provider. In some instances, the third-party system 104 can refer to an entity that provides a service or a product to the user.

Although not a required part of the communication system 100, in some embodiments the third-party system 104 communicates with the survey system 108 in response to one or more user actions within or on the third-party system 104 (i.e., a trigger event). Based on receiving an indication of a trigger event, the survey system 108 can initiate an electronic survey with the user via a message platform. For example, the third-party system can send an indication of a trigger event based on a user action that indicates a user experience with the third-party content on the third-party system, such as customer service, help with a purchase, question about a product, a complaint or other feedback that the third party is interested in obtaining. In view of the foregoing, the third-party system 104 may correspond to an entity desiring feedback about one or more aspects of the third-party system 104 and/or user experiences with the third-party system 104.

As noted above, the communication system 100 also includes an instant messenger platform 120 (or simply "messenger platform 120). The messenger platform 120 can provide an instant messaging service to allow one or more computer devices to communicate. In some embodiments, and as shown in FIG. 1, the messenger platform 120 can be integrated within the third-party system 104. For example, a third-party system 104 can include a messaging platform 120 for specific use within the third-party system 104. In other embodiments, the messenger platform 120 can be separate from the third-party system 104, such as a stand-alone messaging platform, a messaging platform provided by a social networking system, or a messaging platform provided by a communication system. For ease of explanation below, various embodiments of the communication system are discussed primarily with respect to the configuration shown in FIG. 1, although the methods, functions, and features of these embodiments are likewise applicable to configurations where the messenger platform 120 is separate from the third-party system.

The messenger platform 120 can include an application program interface ("API") that includes a set of routines, protocols, and tools for specifying and managing how the survey system 108 and the application 112 of the client device 102 send and receive instant messages. In particular, the messenger platform 120 defines the methods of communication and required formats of data for use within the messenger platform 120. For example, as is discussed in greater detail below, the messenger platform 120 API facilitates communication between the survey system 108 and the messenger platform 120 by defining the format of data that the survey system 108 provides to the messenger platform 120.

Accordingly, as also will be discussed in greater detail in regard to FIGS. 2A-2G, the messenger platform 120 receives survey queries in the form of instant messages from the survey system 108, and provides the instant messages to the client device 102 within an instant messenger communication thread. Additionally, the messenger platform 120 can receive response instant messages from the client device 102 based on the user 116 inputting a response into the communication thread, and in turn, provide the response instant messages to the survey system 108.

As noted above, the survey system 108 can administer an electronic survey within an instant message environment. In particular, the survey system 108 can send instant messages including survey inquiries to the user 116 via the messenger platform 120. Moreover, based on a user initiated trigger event (e.g., a user action on the third-party system 104 or an instant message sent to the survey system) the survey system 108 can identify an applicable electronic survey and/or an applicable survey inquiry to provide to the user 116. In some embodiments, based on the trigger event and/or instant message received from the user 116, the survey system 108 can customize a survey inquiry to provide to the user 116.

The client device 102, the survey system 108, the third-party system 104, and the one or more server(s) 110 and 114 communicate via the network 106, which may include one or more networks and may use one or more communication platforms or technologies suitable for transmitting data and/or communication signals. In one or more embodiments, the network 106 includes a combination of cellular network and the Internet or World Wide Web. The network 106, however, can include various other types of networks that use various communication technologies and protocols, such as a corporate intranet, a virtual private network (VPN), a local area network (LAN), a wireless local network (WLAN), a cellular network, a wide area network (WAN), a metropolitan area network (MAN), or a combination of two or more such networks.

Furthermore, although FIG. 1 illustrates a particular arrangement of the client device 102, the survey system 108, the third-party system 104, the messenger platform 120, and the network 106, various additional arrangements are possible. For example, the client device 102 may directly communicate with the survey system 108, bypassing the network 106. Additional details relating to the network 106 are explained below with reference to FIG. 12.

Turning now FIGS. 2A-2G, the sequence-flow diagram shows various acts of the survey system 108, the third-party system 104, the messenger platform 120, and the client device 102 communicating, in accordance with various embodiments of facilitating communications between client device 102 and the survey system 108. The client device 102, the third-party system 104, the messenger platform 120, and the survey system 108 shown in FIGS. 2A-2G may be example embodiments of the client device 102, the third-party system 104, the messenger platform 120, and the survey system 108 described in regard to FIG. 1.

Figure 2A:
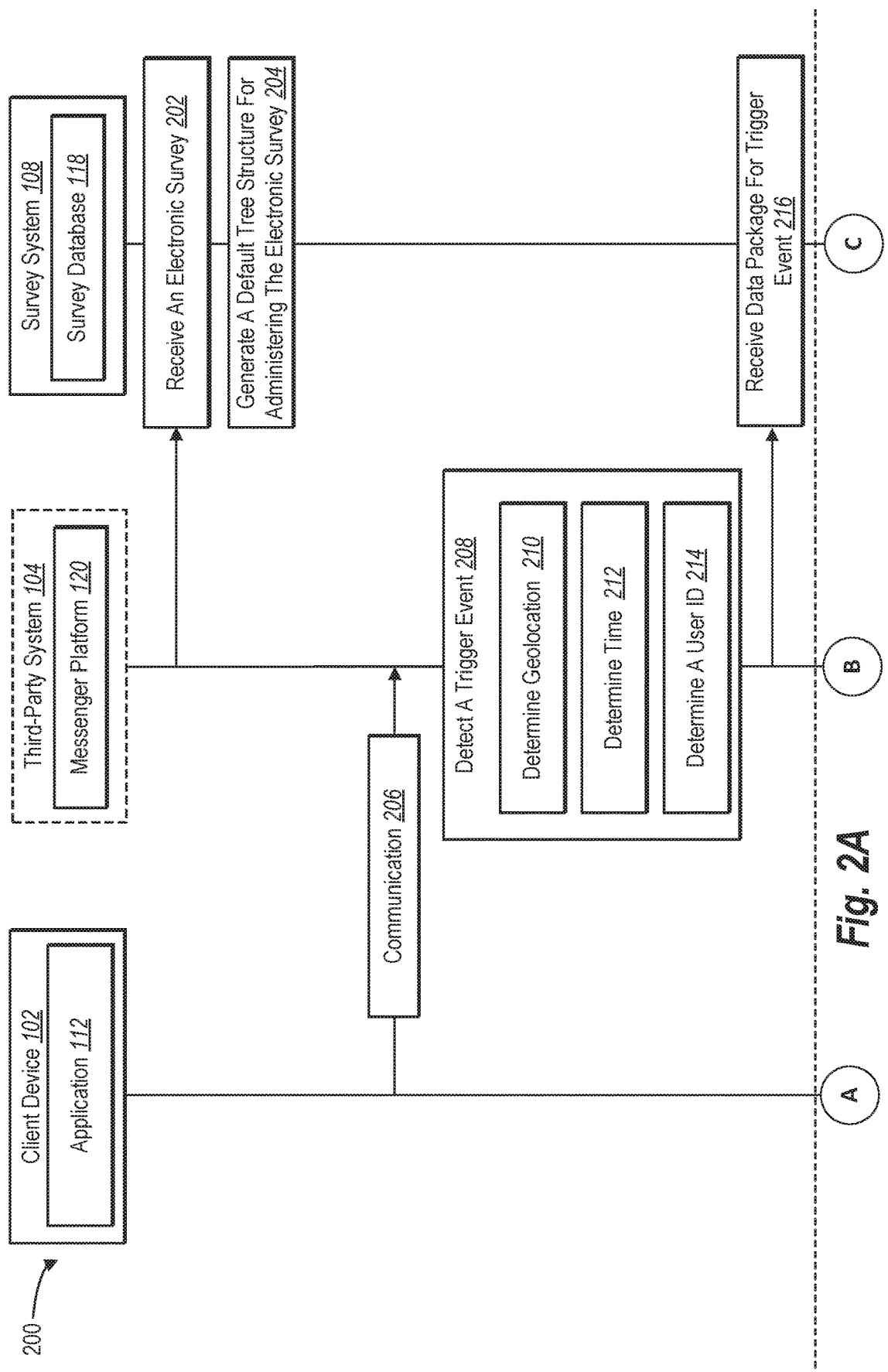

As shown in act 202 of FIG. 2A, the survey system 108 receives an electronic survey from the third-party system 104 to administer to users of the third-party system 104 (e.g., customers of the third-party system 104). In some embodiments, a survey administrator of the third-party system 104 can access the survey system 108 through a web application to create an electronic survey having one or more survey inquiries. As such, the electronic survey can include one or more survey inquiries related to aspects about which the third-party survey administrator wants feedback. As part of creating an electronic survey, the survey administrator can define or more trigger events that cause the survey system 108 to execute or otherwise provide an electronic survey or survey inquiries to a user. Moreover, the survey administrator can setup specific survey inquiries with content or hyperlinks to online content. Accordingly, and as will be discussed below, in response to a particular survey trigger or instant message from a user, the survey system 108 provides the content or hyperlink to online content.

As shown in act 204 of FIG. 2A, upon receiving the electronic survey to administer to users of the third-party system 104, the survey system 108 generates a default tree structure for administering the electronic survey to users. For example, the survey system 108 generates a default tree structure particular to the electronic survey that includes nodes and pathways connecting one or more survey inquiries within the electronic survey. In other words, the survey system 108 generates a map of the nodes and pathways that cause the survey system 108 to identify and provide a specific survey inquiry based on information within a trigger event and/or information within instant messages from a user.

In some embodiments, the survey system 108 can utilize a tree generation engine to generate the default tree structure. For example, the survey system 108 generates the default tree structure by determining an inquiry type of each of the one or more survey inquiries. Furthermore, based on the inquiry type, the survey system 108 determines what type(s) of analysis (e.g., keyword detection, natural language processing, etc.) are requisite to properly determine if a response instant message from a user includes one or more predicted responses associated with the survey inquiry. Moreover, based on an analysis of a response instant message, the default tree structure links to subsequent survey inquiries of the electronic survey. Generation of the default tree structure is described in greater detail below in regard to FIG. 3.

Referring still to FIG. 2A, the third-party system 104 receives a communication from the client device 102, as shown in act 206 of FIG. 2A. Furthermore, the communication can provide an indication of one or more user interactions by a user (e.g., user 116) with the third-party system 104 of the client device 102. For example, the communication can include an indication of one or more user interactions of a user with the third-party system 104. For instance, in some embodiments, the communication can indicate that a user completed a purchase within the third-party system 104, canceled a purchase, added a product to an online shopping cart, submitted a complaint, initiated an instant message session with the third-party system 104, spent a specific amount of time logged into the third-party system 104, spent a specific amount of time without interacting with the third-party system 104, spent a specific amount of time on a particular webpage of the third-party system 104, or other discernable user interaction with the third-party system 104.

Based on the received communication, the third-party system 104 detects whether the communication corresponds to a trigger event, as shown in act 208 of FIG. 2A. For example, the third-party system 104 can determine whether the user action matches a defined trigger event according to definitions set by the administrator of the third-party system 104. In other words, whether the user interaction pertains an aspect of the third-party system corresponding that an electronic survey on the survey system 108. As used herein, a "trigger event" refers to a definition of a user action (or inaction) with respect to electronic content. A trigger event, for example, can generally include any user action with respect to electronic content, that includes, but is not limited to as accessing content, viewing content, selecting content, navigating through content, navigating away from content, providing user input data, or other actions.

More specific user action examples include, but are not limited to, a completed a purchase, canceled a purchase, added a product to an online shopping cart, spent above a defined amount of money, signed up for a user account, submitted a complaint, initiated an instant message session with the third-party system 104, a duration of time logged into the third-party system 104, a duration of time without interaction with the third-party system 104, viewed a particular webpage for a defined duration of time, or other discernable user interaction. In one or more embodiments, detecting a trigger event within the communication can include identifying user input. As used herein, the term "user input" can refer to textual input provided by the user. For instance, the third-party system 104 can determine whether the trigger event includes a user initiated instant message. In one or more embodiments, a user can input a user initiated message based on selecting a "help link," "complaint link," or "feedback link." Thus, in at least some embodiments, the user input can also include an indication of a subject of the user initiated instant message.

FIG. 2A shows three additional examples of detecting a trigger event. For example, act 210 of FIG. 2A shows that detecting a trigger event can include determining a geolocation of the client device 102 at a time of the communication matches a defined geolocation corresponding to a trigger event. For example, the application 112 of the client device 102 can communicate with a Global Positioning System ("GPS") receiver of the client device 102. The GPS receiver communicates with one or more GPS satellites and GPS control stations, as is known in the art, to determine a current position (e.g., geolocation) of the GPS receiver. Thus, the application 112 of the client device 102 may acquire data representing the current position of the GPS receiver and provide the acquired GPS data to the third-party system 104 (e.g., within the communication).

In further embodiments, detecting a trigger event can include determining a time of a user action associated with the communication, as shown in act 212 of FIG. 2A. For example, the third-party system 104 can determine a time of day, day of the week, and/or date at which the communication occurred. In some instances, the third-party system 104 can determine a time corresponding to the user action based on a timestamp associated with the communication. The system then detects a trigger event based on determining the time associated with the user action corresponds to a defined time for a trigger event.

In one or more embodiments, detecting a trigger event can include identifying a user identifier associated with the communication, as shown in act 214 of FIG. 2A. For example, the third-party system 104 can determine a user account associated with the user can initiates the user action on the third-party system 104. Based on the user account, the third-party system 104 can determine whether a user identifier associated with the account matches a user identifier defined within a trigger event. In further embodiments, the third-party system 104 can determine a username or other identifier associated with the user. In other embodiments, the user identifier can be assigned to a user by the third-party system 104 when a user initiates a message. In other embodiments, the user identifier can be a purchase number. Similarly, in some embodiments, detecting a trigger event can include identifying a client device identifier for the client device associated with the user. For instance, the third-party system 104 can determine a media access address (i.e., MAC address) for a user's client device, and detect if the MAC address is associated with a trigger event.

Although FIG. 2A shows that receiving the communication and detecting of a trigger event based on the communication is performed with respect to the third-party system 104, in some embodiments, the communication can be sent directly to the survey system 108, and the survey system 108 can detect a trigger event and proceed with identifying a survey inquiry as described further below.

Returning to FIG. 2A, upon the third-party system 104 detecting a trigger event, the third-party system survey system 108 receives a data package regarding the trigger event, as shown in act 216 of FIG. 2A. For example, upon detecting a trigger event, the third-party system 104 can provide to the survey system 108 a data package including data describing one or more attributes of the trigger event. In some instances, the data package includes one or more of an alert, a notice, a message, an advisory, or a communication notifying the survey system 108 of the trigger event.

Furthermore, the data package includes details or attributes of the trigger event. For example, the data package includes data that indicates a type of the trigger event (e.g., a reference to a user action), user input associated with the trigger event, a geolocation of the client device 102 at a time of the trigger event, a time of the trigger event (e.g., a timestamp), a user identifier associated with the trigger event, a client device 102 identifier associated with the trigger event, etc.

Figure 2B:
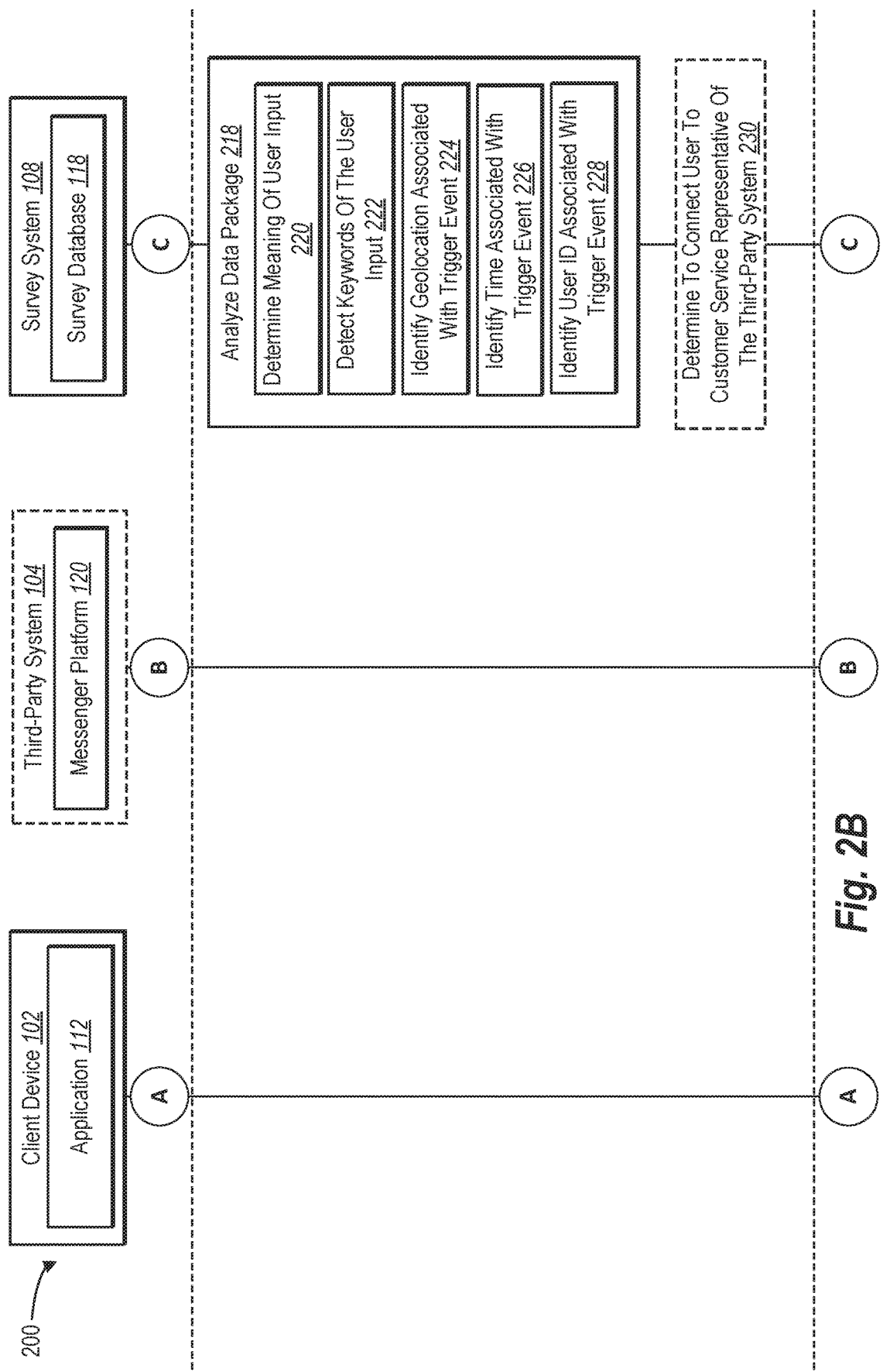

Upon receiving the data package, the survey system 108 analyzes the data package, as shown in act 218 of FIG. 2B. In some embodiments, the survey system 108 can determine a meaning (e.g., a sentiment) of a user input associated with the trigger event, as shown in act 220 of FIG. 2B. In particular, the survey system 108 can process user input utilizing a natural language processing ("NLP") system for processing the user input (e.g., within a user initiated instant message). For example, the survey system 108 can include any NLP process known in the art. The NLP processes can include, but are not limited to, lemmatization, segmentation, part-of-speech tagging, parsing, semantics, OCR, sentiment analysis, topic segmentation and recognition, discourse analysis, and/or other processes. One or more NLP processes can include machine learning and/or deep learning techniques that include providing a training corpora to a matching learning algorithm or neural network to train a machine to aid or perform the natural language processing. Additionally, the NLP processes can include determining brand specific words (e.g., Prime for Amazon). For example, the NLP processes can include determining custom terms and can match those custom terms to the associated meanings of the custom terms based on the associated brand. Furthermore, based on the determined brand specific words, the NLP processes can determine meanings of the user input associated with the trigger event.

Accordingly, the survey system 108 can analyze any user input associated with the trigger event via the NLP system to determine and derive meanings of the user input associated with the trigger event. For example, depending on the detected trigger event, the survey system 108 can analyze, via the NLP system, one or more of a user initiated instant message, a provided reason for a cancelation of a purchase, a product review, etc. In some instances, via the NLP system, the survey system 108 can identify a desire expressed (i.e., what the user wants) in the user input of the trigger event. As a non-limiting example, the survey system 108 can determine that a user wants more information about a particular product. Furthermore, utilizing the NLP system, the survey system 108 can determine a sentiment associated with the trigger event, for example, an attitude, a feeling, and/or emotion expressed within the user input. For example, the survey system 108 can determine whether the user input indicates that the user is happy, sad, angry, upset, satisfied, etc. in regard to the trigger event.

As part of, or in addition to, determining a meaning associated with the trigger event, in some instances, the survey system 108 detects one or more keywords included within a user input associated with the trigger event, as shown in act 222 of FIG. 2B. In particular, the survey system 108 can include a keyword detection system for processing and detecting keywords from human and/or natural language input (e.g., a user initiated instant message). For example, the survey system 108 can include any keyword detection system known in the art. Accordingly, the survey system 108 can analyze user input associated with the trigger event via the keyword detection system to determine and detect keywords included in the user input. In one or more embodiments, keywords and phrases can be defined by one or more of the third-party system 104 and the survey system 108. For example, the keywords and/or phrases can be associated with defined trigger events and topics that correspond to electronic surveys within the survey system 108.

Additionally, as mentioned above, in one or more embodiments, the survey system 108 identifies a geolocation associated with the trigger event, as shown in act 224 of FIG. 2B. For example, the survey system 108 can determine a geolocation of the client device 102 when the user performed an action with respect to the third-party content. In some embodiments, the survey system 108 can determine the geolocation based geo-information included in data package provided to the survey system 108.

Moreover, as discussed above, the survey system 108 identifies a time associated with the trigger event, as shown in act 226 of FIG. 2B. For example, the survey system 108 can determine a time at which the user interacted with the third-party content. In some embodiments, the survey system 108 determines the time associated with the trigger event based on a timestamp included within the data package provided to the survey system 108.

Furthermore, the survey system 108 identifies a user identifier associated with the trigger event, as shown in act 228 of FIG. 2B. For example, the survey system 108 can determine the user identifier associated with the user that performed the user action with respect to the third-party content based on the user identifier determined by the third-party system 104. As mentioned above, the user identifier may be specific to an account of the user with the third-party system 104. For example, in some embodiments, the user identifier may be based on the relationship between the user and the third-party system 104 (e.g., a user account). The survey system 108 can determine the user identifier based on information within the data package.

In some embodiments, based on the analysis of the trigger event, the survey system 108 determines to connect a user associated with the trigger event with a customer service representative of the third-party system 104, as shown in act 230 of FIG. 2B. For example, if based on the analysis of the trigger event (e.g., the meaning and/or sentiment of the trigger event), the survey system 108 determines that a current situation of the user associated with the trigger event meets a negativity threshold based on the NPL and/or keyword analysis, the survey system 108 can determine to connect the user with a live customer service representative of the third-party system 104 to allow a live customer service representative to interact with the user via the instant message platform 120. In particular, if based on the analysis of the trigger event, the survey system 108 detects particular keywords, determines a sentiment score that indicates anger, or determines that user input indicates the user likely requires immediate attention, the survey system 108 can connect the user with a customer service representative of the third-party system 104. In additional embodiments, if based on the analysis of the trigger event, the survey system 108 determines that a user input associated with the trigger event includes particular keywords (e.g., "customer service," "immediate assistance"), the survey system 108 can determine to connect the user with a customer service representative of the third-party system 104.

Figure 2C:
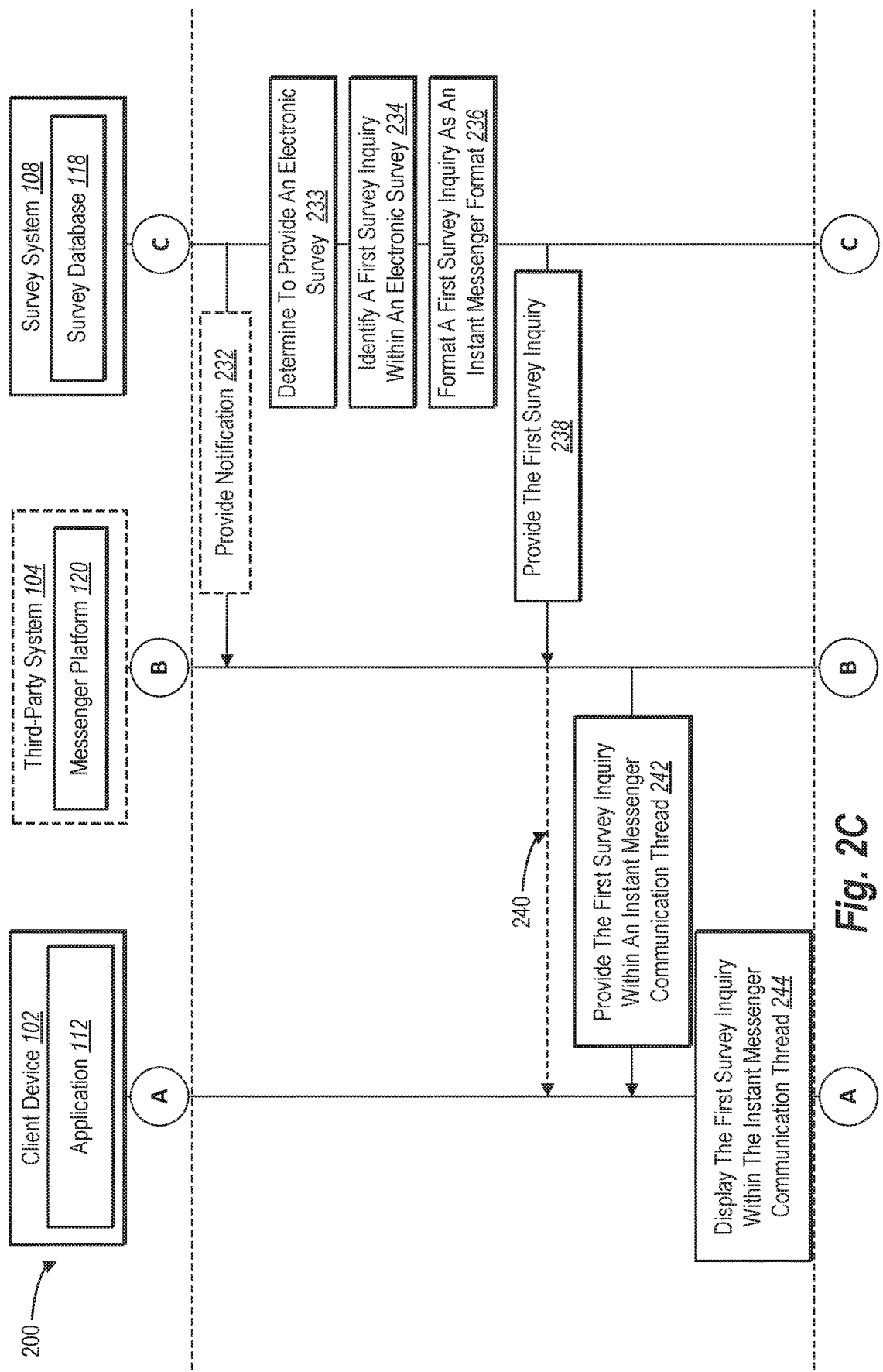

In such embodiments, the survey system 108 can send a notification to the third-party system 104 that the user associated with the trigger event requires attention, as shown in act 232 of FIG. 2C. In some embodiments, the notification can include a description of the trigger event. In addition, based on the analysis performed by the survey system 108, the survey system 108 provides a status of the trigger event, identification of the user, and/or any user input included in the trigger event. In some embodiments, the notification causes third-party system 104 to launch an instant message communication thread for a customer service representative of the third-party system 104, where the communication thread includes the information associated with the trigger event, as described above. Thus, the notification can include an instant message from the survey system 108 to the third-party system 104 customer service representative.

In less time-critical instances, and based on the analysis of the trigger event, the survey system 108 determines top provide an electronic survey to the user, as shown in act 233 of FIG. 2C. For example, based on the meaning of the user input, keywords of the user input, a geolocation associated with trigger event, and/or a time associated with trigger event, the survey system 108 can determine whether a user would likely be interested in receiving an electronic survey. As a non-limiting example, if the user input indicates that the user was unsatisfied with a shipping method, the survey system 108 may determine that the user is likely interested in completing a survey regarding shipping methods of the third-party system 104.

For example, based on the analysis of the trigger event, the survey system 108 can determine a predicted user interest. Specifically, based on the meaning of the user input and/or keywords of the user input, the survey system 108 can determine a predicted user interest (e.g., interest of the user in a particular product, service, or content indicated in the user input). As a non-limiting example, if the trigger event indicates a product added to a cart or an amount of time of activity by the user on a particular webpage of the third-party system 104, the survey system 108 can determine that the user is likely interested in the product added to the cart or the content of the particular webpage.

Also referring to FIG. 2C, based on the predicted user interest the survey system 108 identifies an electronic survey to provide to the client device 102, as shown in act 234 of FIG. 2C. For example, based on the predicted user interest, the survey system 108 identifies a survey inquiry to provide to the user that relates to the predicted user interest. In particular, based on the predicted user interest, the survey system 108 can query the survey database 118 to determine an electronic survey and/or survey inquiry that matches the trigger event. For example, if the survey system 108 determines that a user is interested in purchasing a product, the survey system 108 can identify an electronic survey correlating to the product. As another non-limiting example, if the survey system 108 determines that the user purchased a product, the survey system 108 can identify an electronic survey correlating to a purchasing experience. In addition, the survey system 108 can identify a first survey inquiry of the electronic survey to provide to the client device 102 based on the determined default tree structure of the electronic survey (e.g., the default tree structure generated in act 204 of FIG. 2A).

In some embodiments, the first survey inquiry can include an intermediate survey inquiry. In one or more embodiments, the first survey inquiry can include a reference to one or more attributes included within the trigger event data package. In addition, the first survey inquiry can include a question about the trigger event reference. For example, based on the data within the data package, the survey system 108 may determine that the user is interested in Product A. However, the system cannot determine a particular interest in Product A (e.g., customer service, product information, product review).

In such a case, the survey system can generate a generic survey inquiry that includes a reference to Product A, and question intended to invoke a response from the user to indicate the user's specific interest in Product A. For example, "Thank you for your interest in Product A. What would you specifically like to know with respect to Product A?" In other embodiments, the first survey inquiry can include a verification survey inquiry. For instance, the first survey inquiry can ask the user whether an identified meaning and/or detected keywords of the user input of the trigger event is correct. For example, the first survey inquiry can recite "I understand that you are concerned about the delivery date of your purchased Product A. Is that correct?" Determining a survey inquiry to provide to the client device 102 is described in greater detail in regard to FIG. 4.

Upon determining an electronic survey and/or the first survey inquiry to provide to a user, the survey system 108 formats the first survey inquiry to be compatible with the messenger platform 120, as shown in act 236 of FIG. 2C. For example, the survey system 108 can format the first survey inquiry according to the set of routines, protocols, and tools of the messenger platform 120. In one or more embodiments, the survey system 108 can format the first survey inquiry in an instant messenger forma. Furthermore, in some embodiments, formatting the first survey inquiry can include associating the first survey inquiry with a user identifier of the messenger platform 120.

Furthermore, in some embodiments, the survey system 108 provides the formatted first survey inquiry to the messenger platform 120 to be provided to the user in an instant messenger environment, as shown in act 238 of FIG. 2C. As mentioned briefly above, in some embodiments, the messenger platform 120 may be part of the third-party system 104. As a result, in some instances, providing the formatted first survey inquiry to the messenger platform 120 includes providing the formatted first survey inquiry to the third-party system 104.

In other embodiments, as also noted above, the messenger platform 120 may be separate from the third-party system 104 (i.e., a standalone IM platform). In such embodiments, the survey system 108 does not provide the formatted first survey inquiry to the third-party system 104, but rather provides the formatted first survey inquiry to the client device 102 directly through the messenger platform 120, as represented in act 240 of FIG. 2C. In other words, the survey system 108 sends an instant message that includes the first survey inquiry to a user ID within the messenger platform 120, and the first survey inquiry is thus presented within an instant messenger graphical user interface ("GUI") associated with the messenger platform 120 on client device 102.

Continuing with FIG. 2C, the messenger platform 120 can provide the formatted first survey inquiry to the user as an instant message within an instant messenger environment. For example, the messenger platform 120 can provide the formatted first survey inquiry within an instant messenger communication thread, as shown in act 242 of FIG. 2C. In particular, in some embodiments, the application 112 can provide an instant messenger GUI which generates a communication thread and associates a unique thread identifier (hereinafter "thread ID") with the communication thread. As used herein, the term "communication thread" may refer to a two-way instant message communication connection between the client device 102 and the survey system 108. Furthermore, "communication thread" refers to a series of instant message communications between the user 116 and the survey system 108 wherein each instant message of the user 116 and the survey system 108 is added to the communication thread, is associated with the thread ID, and is viewable by both the user 116 and the survey system 108. Accordingly, the survey system 108 sends the formatted first survey inquiry to messenger platform 120, which in turn, causes the client device 102 to add the formatted first survey inquiry to the instant messenger communication thread associated with the user identifier of the messenger platform 120.

Upon receiving the formatted first survey inquiry within the instant messenger communication thread, the client device 102 displays the first survey inquiry to the user, as shown in act 244 of FIG. 2C. For example, the client device 102 can display the first survey inquiry to the user 116 via a display (e.g., touch screen display or monitor) and within an instant message environment. In some embodiments, the client device 102 can display the first survey inquiry within an instant message GUI of the application 112 of the client device 102, which allows the user 116 to interact with the first survey inquiry. For example, in embodiments where the survey inquiry includes a question with potential answers, the client device 102 can display the question and potential answers within the instant message GUI as an instant message. As another non-limiting example, where the survey inquiry includes a hyperlink to purchase a product, the client device 102 can display the hyperlink within the instant message GUI as an instant message.

Furthermore, upon displaying the first survey inquiry, the client device 102 and/or the application 112 detects a user interaction adding an instant message response to the instant messenger communication thread, as shown in act 246 of FIG. 2D. For example, the client device 102 and/or the application 112 detects a user interaction inputting an instant message response within the application 112 in response to the first survey inquiry. As used herein, the terms "user interaction" means a single interaction, or combination of interactions, received from a user by way of one or more input devices (e.g., a touch screen display, a keyboard, a mouse, etc.) of the client device 102. Furthermore, the user interaction may include one or more of clicking, tapping, or otherwise selecting elements (e.g., letters and/or characters) to allow a user to the instant message response. In additional embodiments, the client device 102 and/or application 112 detects a user interaction selecting an instant message response to the first survey inquiry using a touch gesture (e.g., tap gesture, swipe gesture, pinch gesture, etc.) on a touch screen of the client device 102.

Upon detecting the user interaction adding an instant message response to the instant messenger communication thread, the client device 102 provides the instant message response to the messenger platform 120, as shown in act 248 of FIG. 2D. As mentioned briefly above, in some embodiments, the messenger platform 120 may be part of the third-party system 104. As a result, in some instances, providing the instant message response to the messenger platform 120 includes providing the instant message response to the third-party system 104. In other embodiments, as noted above, the messenger platform 120 may be separate from the third-party system 104, and therefore, the client device 102 does not provide the instant message response to the third-party system 104.

In some embodiments, providing the instant message response to the survey system 108 includes providing an additional user input (e.g., text) within the instant message response to the survey system 108. In other embodiments, providing the instant message response to the survey system 108 includes providing an indication that the user interacted with a hyperlink to purchase a product included within the first survey inquiry. In further embodiments, providing the instant message response to the survey system 108 includes providing an indication of a selected response. Further still, in some cases, the survey system 108 creates a survey response based on a lack of response from the user. For example, such a response can include the survey inquiry provided to the user, the time and date sent to the user, and any additional information known from user input or trigger event information.

Furthermore, and as shown in act 252 of FIG. 2D, the survey system 108 receives the instant message response from the messenger platform 120. Upon receiving the instant message response, the survey system 108 analyzes the instant message response, as shown in act 254 of FIG. 2E. In some embodiments, analyzing the instant message response includes determining a meaning (e.g., sentiment) of the instant message response. In one or more embodiments, analyzing the instant message response includes detecting keywords, determining a location associated with the instant message response, determining a time associated with the instant message response, and/or comparing a geolocation and/or time associated with the instant message response to a geolocation and/or time associated with the trigger event, as illustrated in acts 256-263. In yet further embodiments, analyzing the instant message response includes analyzing emojis and/or symbols included in the instant message response. Additionally, analyzing the instant message response includes analyzing multiple different languages within the instant message response. Determining meaning, key words, geolocation, and times can include performing the above processes described with respect to acts 220-228.

Figure 2E:
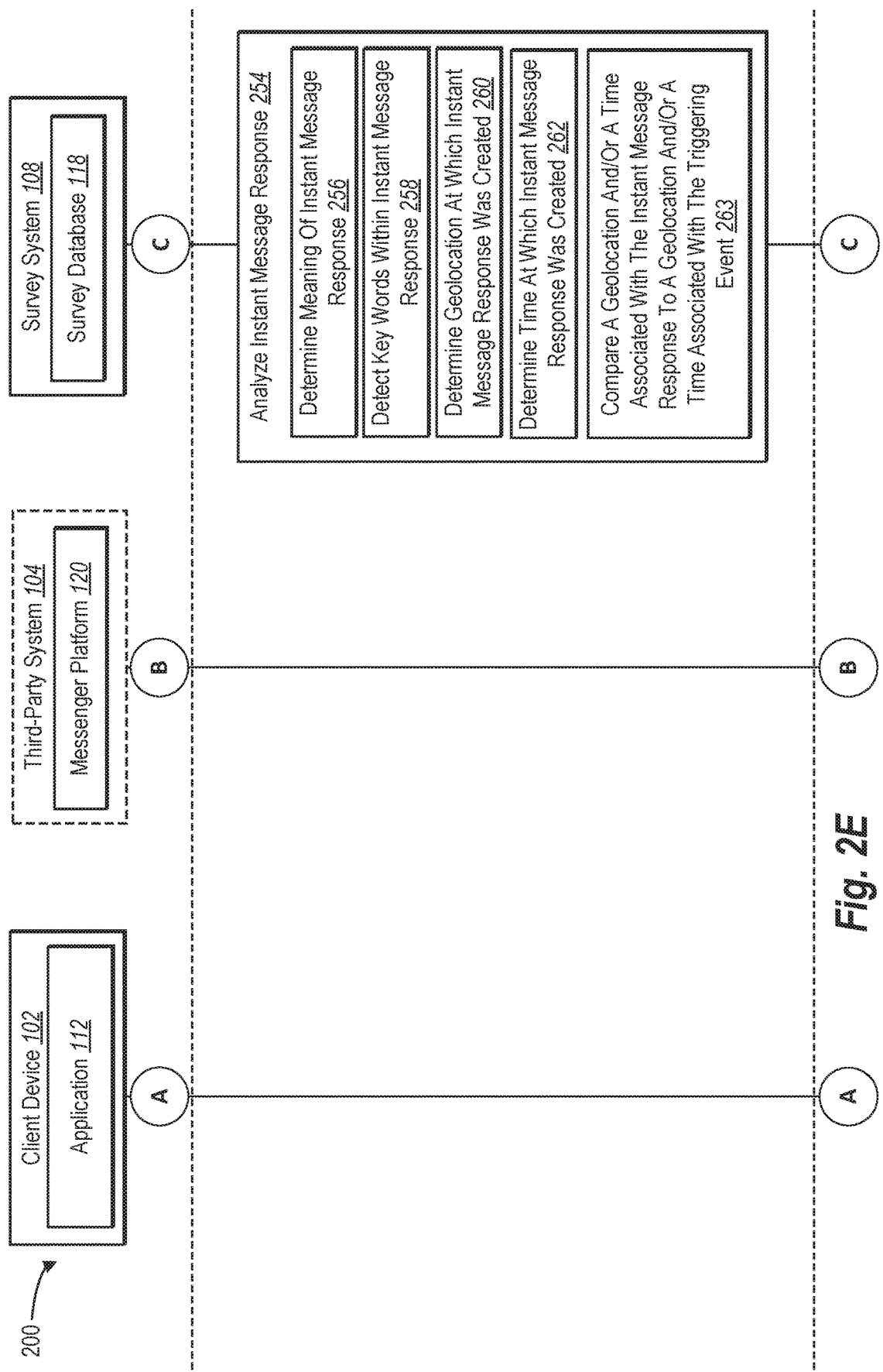

Moreover, analyzing the instant message response can include comparing a geolocation and/or time associated with the instant message response to a geolocation and/or time associated with the trigger event, as shown in act 263 of FIG. 2E. For example, in some embodiments, the survey system 108 can compare a geolocation of the trigger event to a geolocation of the instant message response. As a result, the survey system 108 can determine (e.g., interpolate) a path traveled by the client device 102 between the trigger event and the instant message response. Furthermore, as a result, the survey system 108 can determine geolocations where a user is more likely to provide an instant message response. As another non-limiting example, the survey system 108 can compare a time of the trigger event to a time of the instant message response.

In yet further embodiments, analyzing the instant message response merely includes determining that the user interacted with the first survey inquiry. For example, analyzing the instant message response can include determining that the user interacted with a hyperlink of the instant message response. In particular, analyzing the instant message response can include determining that the user interacted with a hyperlink to purchase a product. Analyzing the instant message response is described in greater detail below in regard to FIGS. 4-7.

Although the survey system 108 is described herein as receiving an instant message response, the disclosure is not so limited. For example, in some embodiments, the survey system 108 may not receive an instant message response via the messenger platform 120 For instance, a user may choose not to respond to an instant message response received from the survey system 108 via the messenger platform 120.

Furthermore, in response to not receiving an instant message response via the messenger platform 120, the survey system 108 can determine a status of the user within the messenger platform 120. For instance, the survey system 108 can communicate with the messenger platform 120 to determine a status of the user within the messenger platform 120. In particular, the survey system 108 can determine whether the user is active or inactive within the messenger platform 120. In some embodiments, the survey system 108 can determine a status of the user within the messenger platform 120 in response to not receiving an instant message response after a specified period of time. For example, the specified period of time can include one of an hour, a day, a week, a month, etc.

If on one hand, the survey system 108 determines that the user is active, the survey system 108 can again provide the formatted first survey inquiry to the instant message communication thread via the messenger platform 120. If on the other hand, the survey system 108 determines that the user is inactive, the survey system 108 can monitor the status of the user within the messenger platform 120 until the status of the user is active. Upon determining that the user status changed from inactive to active, the survey system 108 can again provide the formatted first survey inquiry to the instant message communication thread of the user.

Figure 2F:
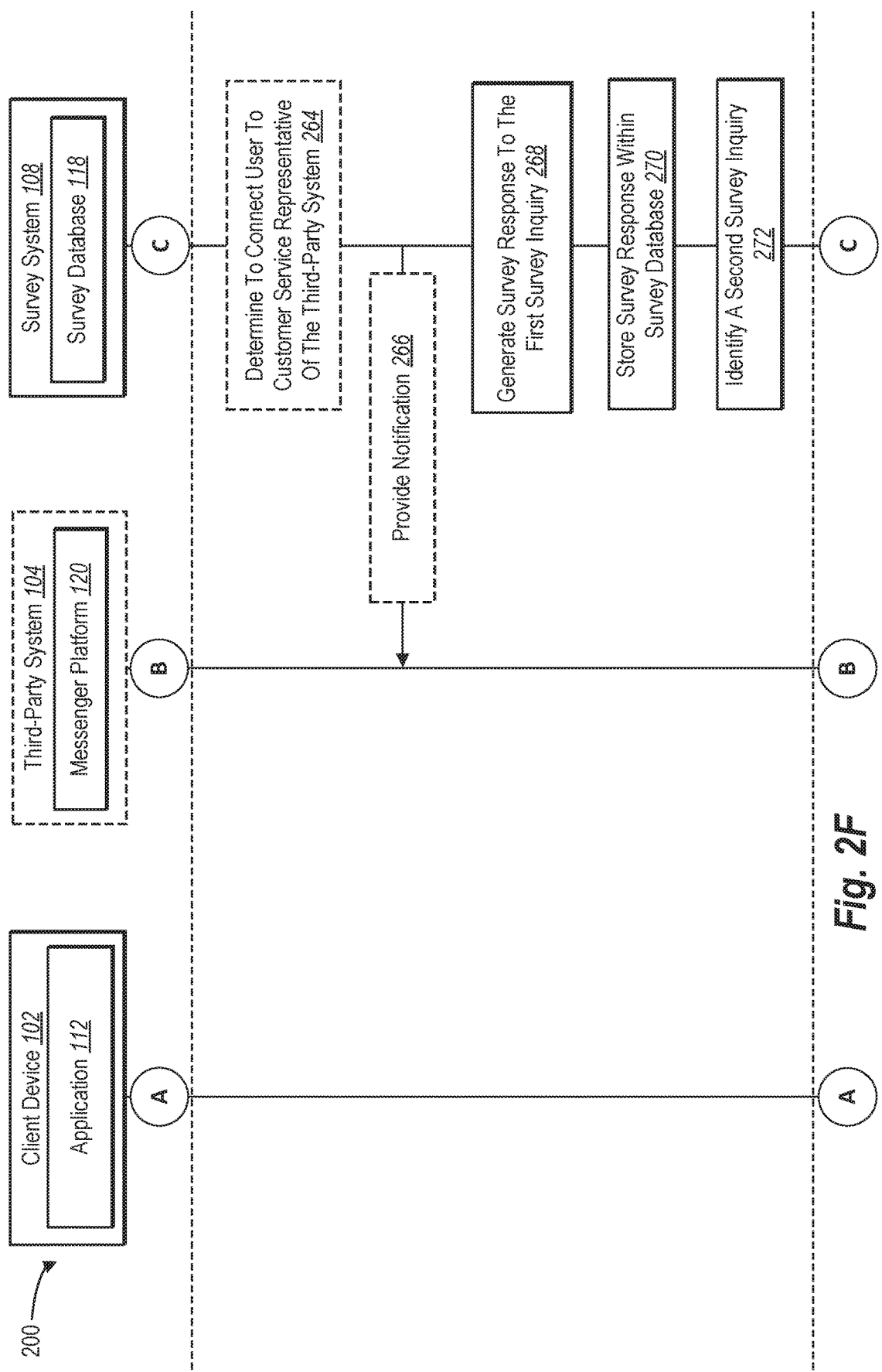

Referring to FIG. 2F, in embodiments where the survey system 108 receives an instant message response, in some embodiments, based on the analysis of the instant message response, the survey system 108 determines to connect the user associated with the instant message response with a customer service representative of the third-party system 104, as shown in act 264, and as described above with respect to act 232.

In response to analyzing the instant message response, the survey system 108 generates a survey response to the first survey inquiry, as shown in act 268 of FIG. 2F. As used herein, a "survey response" is data that represents a user's response to a survey inquiry within the survey database 118. A survey response may indicate a user input data (e.g., text response). In other cases, a survey response can be selected from a plurality of available answers to a particular survey inquiry (e.g., multiple choice question) based on identified key words. Moreover, a survey response can include metadata that identifies a geolocation associated with the instant message response, a time associated with the instant message response, and/or a user identifier associated with the response.

In some embodiments, a survey response may be associated with a particular survey inquiry (inquiry ID) within a particular electronic survey (survey ID). Accordingly, a survey database 118 stores multiple responses from multiple users for a particular survey inquiry within a particular electronic survey. In this way, the survey system 108 can provide reporting and results for a survey inquiry across all participant users, as shown in act 270 of FIG. 2F. Generating the survey response and storing the survey response in the survey database 118 are discussed in greater detail below in regard to FIGS. 6A-6C.

In addition to generating a survey response to store in the survey database 118, the survey system 108 identifies a second survey inquiry to provide to the user. For instance, the survey system 108 can query the survey database 118 to determine a second survey inquiry matching the determined meaning, keywords, geolocation, time associated with the instant message response. For example, if the survey system 108 determines that a user is interested in purchasing a product via the analysis of the instant message response, the survey system 108 can identify a survey inquiry correlating to the product and/or related products (e.g., a product webpage, a hyperlink to purchase the product, etc.). As another non-limiting example, if the survey system 108 determines that the user purchased a product, the survey system 108 can identify a survey inquiry correlating to providing a product review.

In some embodiments, the second survey inquiry may be a subsequent inquiry of a same electronic survey as the first survey inquiry. In additional embodiments, the second survey inquiry may be a survey inquiry of a different electronic survey. In further embodiments, the second survey inquiry may include a verification inquiry to determine whether the survey system 108 properly determined a meaning of the instant message response. Identifying a second survey inquiry to provide to the user based on the analysis performed by the survey system 108 is described in greater detail below in regard to FIGS. 5-7.

In response to identifying the second survey inquiry, the survey system 108 formats the second survey inquiry to be compatible with the messenger platform 120, as show in act 274 of FIG. 2G. Upon formatting the second survey inquiry to be compatible with the messenger platform 120, in some embodiments, the survey system 108 causes the formatted second survey inquiry to be sent to client device 102 via the messenger platform 120. Acts 274-278 include the same or similar processes as described above with respect to 236-244. Furthermore, upon providing the second survey inquiry to the messenger platform 120, the survey system 108 can repeat acts 242-276 while successively providing survey inquiries to the client device 102. In some embodiments, the survey system 108, the messenger platform 120, and the client device 102 can repeat acts 242-276 until an electronic survey is completely administered (e.g., completely administered). In alternative embodiments, the survey system 108, messenger platform 120, and the client device 102 can repeat the acts until the survey system 108 determines that the user requires a live customer service.

Referring to FIGS. 2A-2G together, although the instant messenger communication thread is described herein as occurring within a single messenger platform, the disclosure is not so limited. For example, in some embodiments, the survey system 108 can provide the first survey inquiry within a first messenger platform, and the survey system 108 can receive the instant message response within a second messenger platform. Furthermore, survey system 108 can provide the second survey inquiry in yet a third messenger platform. As a result, survey system 108 of the present disclosure is messenger platform agnostic.

Figure 3:
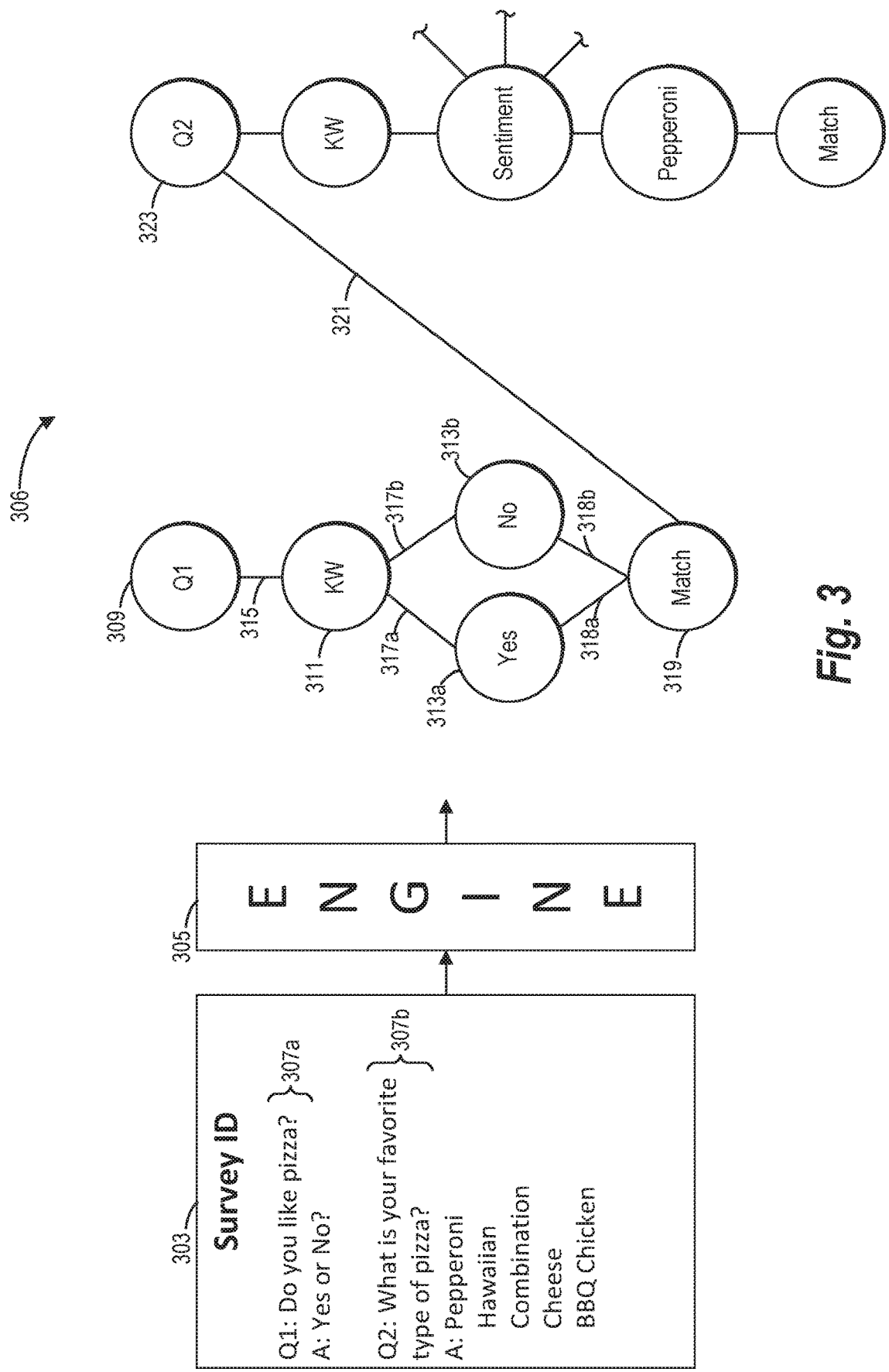
FIG. 3 illustrates a schematic flow diagram showing acts that an electronic survey system may utilize to generate a default tree structure for an electronic survey according to one or more embodiments of the present disclosure.

As described briefly above in regard to act 202 of FIG. 2A, in some embodiments, the third-party system 104 can provide the survey system 108 with an electronic survey, and the survey system 108 can generate a default tree structure defining pathways and nodes for administering electronic survey inquiries (e.g., survey questions) of the electronic survey. Furthermore, in some embodiments, the survey system can provide the default tree structure to a user within a user interface of the survey system 108, and the user can interact with the default tree structure within the user interface and can customize the pathways and nodes of the default tree structure. For example, FIG. 3 illustrates a schematic flow diagram showing acts that a survey system 108 of the present disclosure may utilize to generate a default tree structure of a given electronic survey. As show in FIG. 3, in one or more embodiments, a survey administrator creates an electronic survey by accessing the survey system 108. The electronic survey 303 can have an associated survey ID and one or more survey inquiries 307a, 307b each having inquiry IDs. In some embodiments, the electronic survey 303 may include a predetermined order of the one or more survey inquiries.

Based on the content of the electronic survey, the survey system 108 can analyze the electronic survey 303 and the included survey inquiries 307a, 307b to determine a default tree structure 306 for administering the electronic survey 303. In some embodiments, the survey system 108 can analyze the electronic survey 303 with a tree generation engine 305 to determine a default tree structure 306 for administering the electronic survey 303. Furthermore, in one or more embodiments, analyzing the electronic survey 303 includes determining a type of each inquiry 307a, 307b. Moreover, based on the type of inquiry 307a, 307b, the survey system 108 determines requisite analysis needed to match user inputs to potential responses of the electronic survey 303. Each of the foregoing is described in greater detail below.

As noted above, the survey system 108 (e.g., the tree generation engine 305 of the survey system 108) analyzes the electronic survey 303 to determine a type of each inquiry 307a, 307b included within the electronic survey 303. For instance, based on one or more of a data type of an inquiry 307a, 307b, listed responses choices of an inquiry 307a, 307b, and a format of an inquiry 307a, 307b, the survey system 108 determines a type of inquiry 307a, 307b. In one or more embodiments, the survey system 108 can determine whether a given inquiry 307a, 307b is a multiple-choice inquiry, a "yes or no" inquiry, matrix table inquiry, a descriptive text inquiry, a slider inquiry, a rank order inquiry, a constant sum inquiry, a NET PROMOTER SCORE inquiry, etc. For example, if the survey system 108 determines that a survey inquiry 307a, 307b includes response choices of "yes" and "no," the survey system 108 determines that the inquiry is of a "yes or no" type inquiry. As another non-limiting example, if the survey system 108 determines that a survey inquiry does not include response choices, the survey system 108 determines that the inquiry is of a free-form text inquiry.

As also mentioned above, based on the type of an inquiry 307a, 307b, the survey system 108 determines requisite analysis needed to match user inputs (e.g., instant message responses) to potential responses (e.g., answers) of the inquiry 307a, 307b. In one or more embodiments, the survey system 108 may determine that an inquiry 307a, 307b may require one or more of determining a data type of a user input, determining a meaning of a user input, and detecting keywords of a user input. For example, if the survey system 108 determines that an inquiry is of a "yes or no" type, the survey system 108 may determine that only a keyword detection analysis is required to match a user input to potential responses to the inquiry 307a, 307b.

As another non-limiting example, if the survey system 108 determines that an inquiry 307a, 307b is of a "multiple choice" type or a descriptive text type, the survey system 108 may determine that a meaning analysis (e.g., sentiment analysis) and a keyword detection analysis may be required to match a user input to potential responses to the inquiry 307a, 307b. As yet another non-limiting example, if the survey system 108 determines that an inquiry 307a, 307b is of a slider type, the survey system 108 may determine that only a data type analysis is required to match a user input to potential responses to the inquiry 307a, 307b.

Based on the determined requisite analysis of each survey inquiry 307a, 307b of the received electronic survey 303, the survey system 108 (i.e., the tree generation engine 305) generates a default tree structure 306 for the electronic survey 303. For example, as illustrated in FIG. 3, the survey system 108 can generate a node 309 representing a first survey inquiry of the electronic survey 303, nodes 311 representing any requisite analysis, nodes 313a, 313b representing potential responses to the first survey inquiry, and a node 319 representing a matched response. Additionally, the survey system 108 can generate a pathway 315 from the node 309 representing a first survey inquiry to the nodes 311 representing any requisite analysis (e.g., a keyword analysis). Furthermore, the survey system 108 can generate pathways 317a, 317b from the nodes 311 representing any requisite analysis to the nodes 313a, 313b representing potential responses to the first survey inquiry. Moreover, the survey system 108 can generate pathways 318a, 318b from the nodes 313a, 313b representing potential responses to the first survey inquiry to the node representing the matched response 319.

Additionally, the survey system 108 can repeat the foregoing for each survey inquiry 307a, 307b of the electronic survey 303 and can create a pathway 321 from the node representing the matched response 319 to a subsequent survey inquiry 323 of the electronic survey. In some embodiments, an order of the survey inquiries 307a, 307b of the electronic survey 303 can be determined by the survey system 108. As a result, the survey system 108 can generate a default tree structure 306 for the electronic survey 303. In some embodiments, the default tree structure 306 can be customizable by an administrator of the third-party system 104. In such embodiments, the default tree structure 306 may be customizable via a graphical user interface of the survey system 108 via user inputs. For example, the nodes and pathways may be draggable and movable within the graphical user interface of the survey system 108. Additionally, the third-party system 104 can add and/or remove nodes within the graphical user interface.

As a brief non-limiting example, in operation, the survey system 108 may follow the default tree structure 306 in administering an electronic survey 303. For example, the survey system 108 may provide a first survey inquiry 309 to the user. In response to receiving an instant message response, the survey system 108 may follow the pathway 315 from the first survey inquiry 309 to any requisite analysis 311 (in this illustration, a keyword detection analysis ("KW")). Upon reaching the requisite analysis 311, the survey system 108 can perform the requisite analysis 311 on the received instant message response.

Furthermore, via the analysis, the survey system 108 can determine whether the instant message response matches a node 313a, 313b representing a potential response. Upon determining that the instant message response matches a node 313a, 313b representing a potential response, the survey system 108 follows an appropriate pathway 317a, 317b to the node 313a, 313b representing the potential response. Furthermore, from the node 313a, 313b representing the potential response, the survey system 108 follows a pathway 318a, 318b to the node 319 representing a matched response. Moreover, from the node 319 representing the matched response, the survey system 108 follows pathway 321 to the second survey inquiry 323.

Likewise, the survey system 108 can repeat the foregoing acts for each survey inquiry of the electronic survey 303. In particular, as shown in FIG. 3, the survey system 108 can provide the second survey inquiry 323, and in response to receiving an instant message response to the second survey inquiry 323, the survey system 108 may follow a pathway from the second survey inquiry 323 to any requisite analysis (in this illustration, a KW analysis and a sentiment analysis (i.e., determining a meaning of the received instant message response)). Upon reaching the requisite analysis, the survey system 108 can perform the requisite analysis on the received instant message response. Furthermore, the survey system 108 can determine a matched response in the same manner described above. For example, the survey system 108 can determine that the instant message response includes a particular answer (in this case "pepperoni") and can match the answer to the matched response. Analyzing the instant message responses and moving through a default tree structure are described in greater detail below in regard to FIGS. 4-7.

Figure 4:
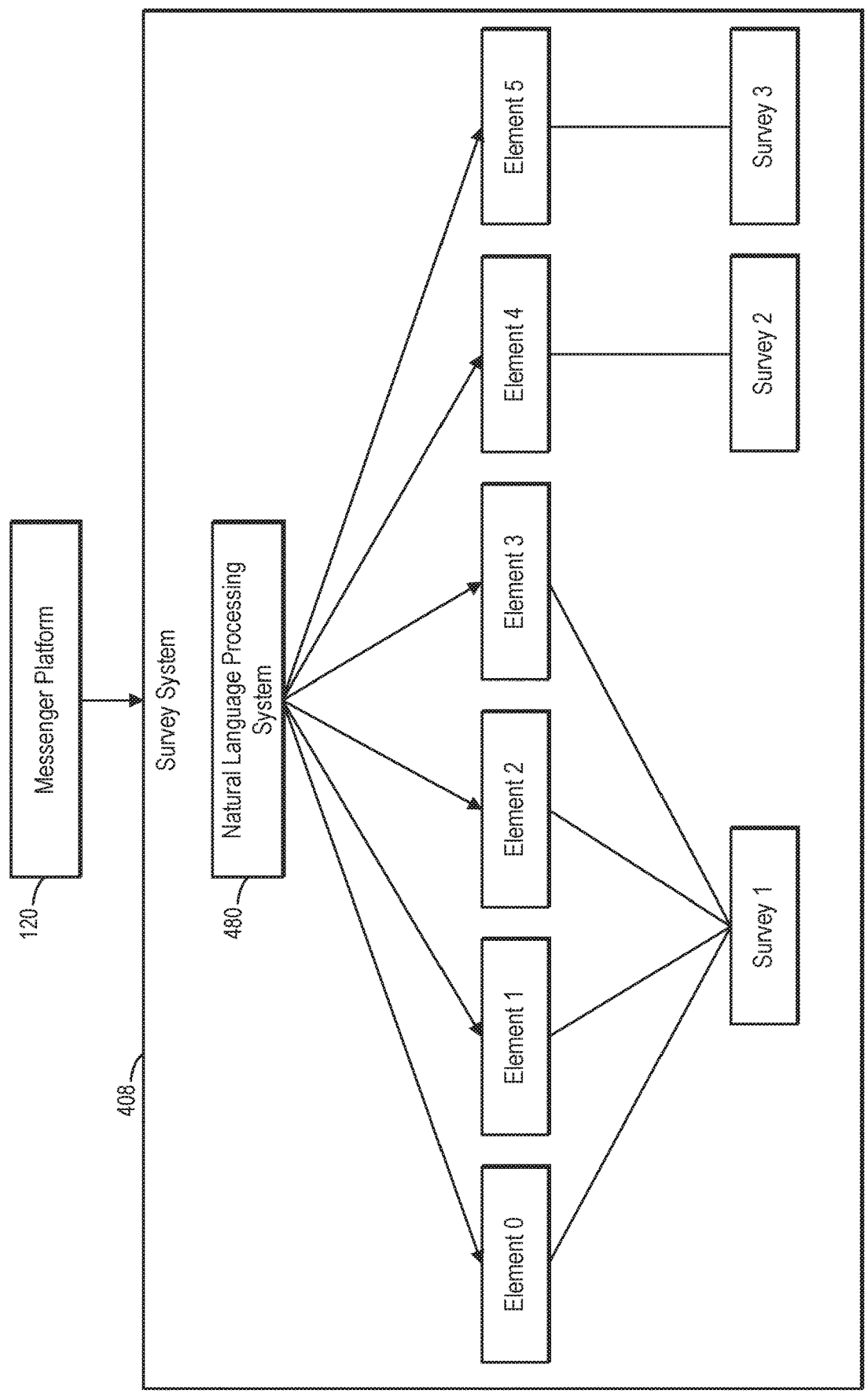
FIG. 4 illustrates a schematic flow diagram of a process that an electronic survey system may utilize to analyze user input of an instant message response to determine a meaning of the user input and to identify an electronic survey to provide to a user according to one or more embodiments of the present disclosure.

FIG. 4 illustrates a schematic flow diagram of a process that a survey system 408 may utilize to analyze user input of an instant message response to determine a meaning of the user input and to identify an electronic survey to provide to a user. As shown in FIG. 4, the survey system 408 can receive an instant message response from the messenger platform 120. In response to receiving the instant message response, the survey system 408 can analyze the instant message response via a natural language processing system 480 to determine a meaning (e.g., a sentiment) of the instant message response. Furthermore, based on the determined meaning of the instant message response, the survey system 408 can determine whether the instant message response includes one or more elements (e.g., Elements 1-5). In some embodiments, the term "elements" can refer one or more of particular sentiments (e.g., emotions and/or attitudes), keywords, phrases, etc.

Furthermore, upon determining that the instant message response includes one or more elements, the survey system 408 can match the instant message response to a particular electronic survey (i.e., one of electronic surveys 1-3). In particular, the survey system 408 can query the survey database 118 to identify electronic surveys and/or survey inquiries correlating to the one or more elements identified in the instant message response. Upon identifying the electronic survey and/or survey inquiry correlating to the one or more elements identified in the instant message response, the survey system 408 can select the identified electronic survey and/or survey inquiry as a match to the instant message response.

In some instances, a given instant message response may include elements correlating to two or more electronic surveys and/or survey inquiries. In such embodiments, the survey system 408 can select a single electronic survey and/or survey inquiry between the two or more electronic surveys and/or survey inquiries based on a number of correlating elements of each electronic survey and/or survey inquiry. For example, the survey system 408 can select a single electronic survey and/or survey inquiry having a highest number of correlating elements with the instant message response.

In other embodiments, the survey system 408 can select a single electronic survey and/or survey inquiry based on confidence values. For instance, the survey system 408 can select a single electronic survey and/or survey inquiry based on a confidence score the survey system 408 calculates with respect to the instant message response correlating to a survey inquiry. In such embodiments, the survey system 408 can select an electronic survey and/or survey inquiry having the element which the survey system 408 has a highest confidence value. In yet further embodiments, the third-party system 104 may have a ranked element system, and the survey system 408 can select an electronic survey and/or survey inquiry based on the ranked element system. For example, the survey system 408 can select an electronic survey and/or survey inquiry having a highest ranked element.

Still referring to FIG. 4, although identifying an electronic survey to provide to a user is described herein with reference to Elements 1-5 and electronic surveys 1-3, one or ordinary skill in the art will readily recognize based on the disclosure herein that an instant message response may include any number of elements, and the elements may correlate to any number of electronic surveys. Furthermore, the survey system 408 may include any number of electronic surveys within the survey database 118. Furthermore, although the analysis described in regard to FIG. 4 is described in terms of an instant message response, the disclosure is not so limited. For example, the survey system 408 can perform the same analysis described in regard to FIG. 4 on user inputs of trigger events. For instance, the survey system 408 can identify elements of a user initiated action that corresponds to a trigger event in order to identify a matching electronic survey.

Figure 5:
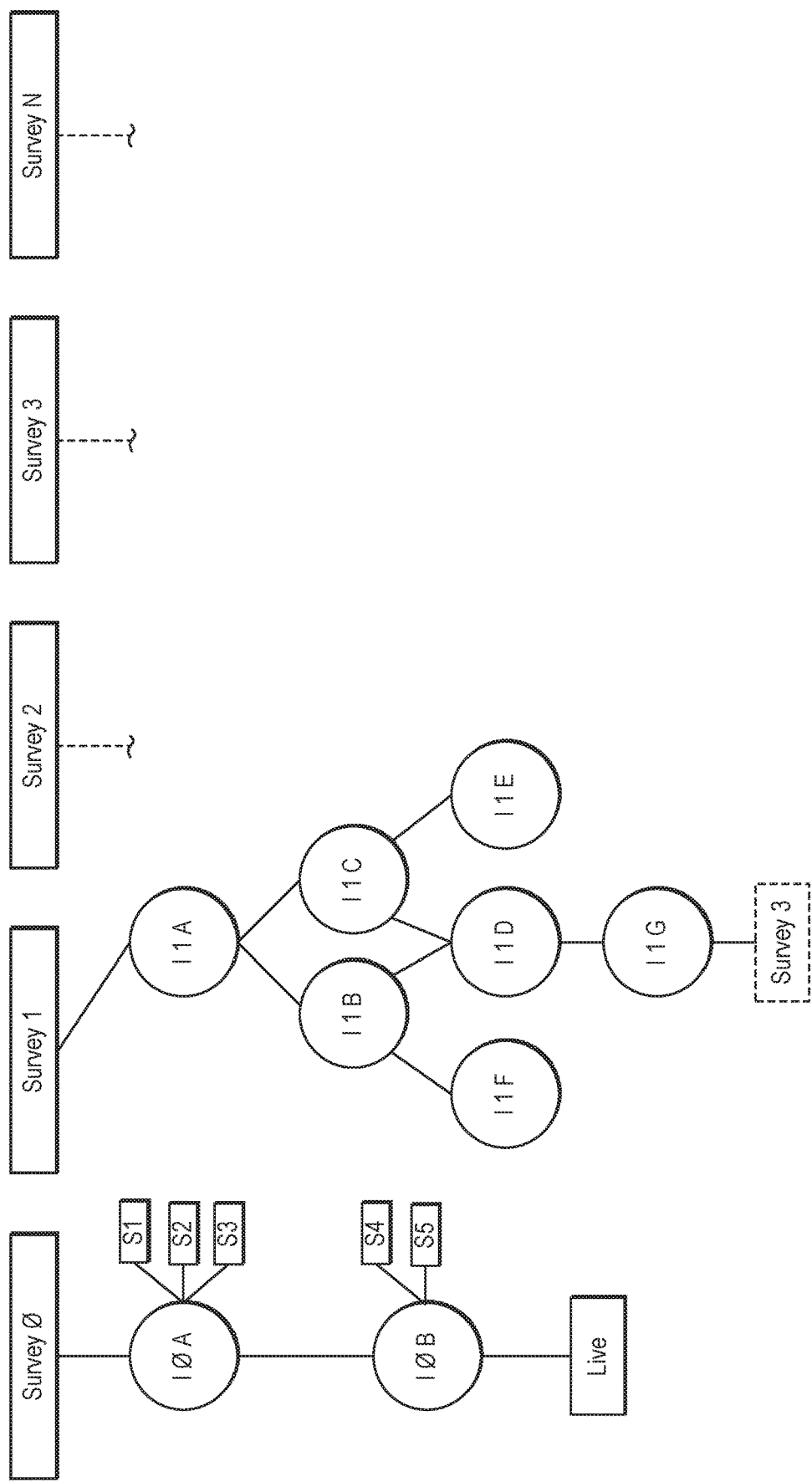
FIG. 5 illustrates example default tree structures of example electronic surveys that an electronic survey system can administer to a user via instant messages according to one or more embodiments of the present disclosure.

FIG. 5 illustrates example default tree structures of example electronic surveys 0-N that the survey system 108 of the present disclosure can administer to a user via instant messages. In particular, FIG. 5 illustrates an example intermediate electronic survey 0 and example electronic survey 1 and respective default tree structures. As mentioned briefly above, the survey system 108 can utilize the intermediate survey 0 to better identify matching subsequent survey inquiries.

As a non-limiting example, as illustrated in FIG. 5, when administering the intermediate survey 0, the survey system 108 can provide a first survey inquiry (I0A) to the user. Furthermore, in some embodiments, the first survey inquiry (I0A) may include an inquiry intended to encourage a response to assist the survey system 108 to better identify an electronic survey matching the trigger event. For example, the first survey inquiry (I0A) can recite certain elements that correlate to particular electronic surveys that may be related to a respective trigger event. For instance, if a user input of the trigger event mentions shipping, the first survey inquiry (I0A) can recite "I understand that you are concerned about the shipment of your purchased product, is that correct?"

In response to providing the first survey inquiry (I0A), the survey system 108 can receive a first instant message response, and in response to receiving the first instant message response, the survey system 108 can analyze the first instant message response in any of the manners described above in regard to acts 254-263 of FIG. 2E. Based on the analysis performed on the first instant message response, the survey system 108 can determine whether the first instant message response assists the survey system 108 in more appropriately identifying an electronic survey to provide to the user. For example, via the analysis, the survey system 108 can determine whether the first instant message response includes one or more elements correlating to an electronic survey via any of the manners described above in regard to FIG. 3.

If the survey system 108 determines that the instant message response includes one or more elements correlating to an electronic survey, the survey system 108 can select a single electronic survey to administer to the user via any of the manners described above in regard to FIGS. 2A-2G. If the survey system 108 determines that the first instant message response does not include one or more elements correlating to an electronic survey, the survey system 108 can provide a second survey inquiry (I0B) to the user again intending to encourage a response to assist the survey system 108 more appropriately identify an electronic survey matching the trigger event.

In response to providing the second survey inquiry (I0B), the survey system 108 can receive a second instant message response, and in response to receiving the second instant message response, the survey system 108 can analyze the second instant message response in any of the manners described above in regard to acts 254-263 of FIG. 2E. Based on the analysis performed on the second instant message response, the survey system 108 can determine whether the second instant message response assists the survey system 108 in more appropriately identifying an electronic survey to provide to the user. For example, via the analysis, the survey system 108 can determine whether the second instant message response includes one or more elements correlating to an electronic survey via any of the manners described above in regard to FIG. 3.

If the survey system 108 determines that the second instant message response includes one or more elements correlating to an electronic survey, the survey system 108 can select a single electronic survey to administer to the user via any of the manners described above in regard to FIGS. 2A-2G. If the survey system 108 determines that the second instant message response does not include one or more elements correlating to an electronic survey, in some embodiments, the survey system 108 can provide an additional survey inquiry to the user again intending to encourage a response to assist the survey system 108 more appropriately identify a matching electronic survey and can repeat the foregoing procedure any number of times in order to identify a matching electronic survey. In alternative embodiments, if the survey system 108 cannot identify a matching electronic survey after providing a predetermined number of survey inquiries, the survey system 108 can determine to connect the user with a customer service representative of the third-party system 104. For example, the survey system 108 can determine to connect the user with a customer service representative in any of the manners described above in regard to acts 230 and 264 of FIGS. 2B and 2F.

As another non-limiting example, as illustrated in FIG. 5, when administering the electronic survey 1, the survey system 108 can provide a first survey inquiry (I1A) to the user. In response to providing the first survey inquiry (I1A), the survey system 108 can receive a first instant message response, and in response to receiving the first instant message response, the survey system 108 can analyze the first instant message response in any of the manners described above in regard to acts 256-263 of FIG. 2E.

Based on the analysis performed on the first instant message response, the survey system 108 can determine which subsequent survey inquiry of the electronic survey 1 to provide to the user. For example, if the first instant message response includes a first predetermined element, the survey system 108 can provide a second survey inquiry (I1B). On the other hand, if the first instant message response includes a second predetermined element, the survey system 108 can a provide third survey inquiry (I1C). Furthermore, the survey system 108 can repeat the foregoing process for each provided survey inquiry of the electronic survey.

Moreover, as illustrated, in some embodiments, in response to providing a survey inquiry (e.g., survey inquiry I1G) and receiving an instant message response, the survey system 108 may determine to begin providing survey inquiries from a different electronic survey. For example, if the user changes subjects (via the instant message response) and wants to discuss another issue, the survey system 108 can adjust and provide a different electronic survey.

Figure 6C:
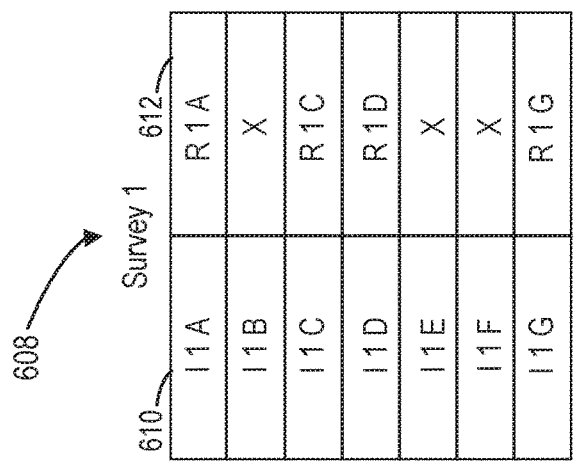
FIG. 6C illustrates an example data table within a survey database where an electronic survey system may store a survey response to an electronic survey inquiry according to one or more embodiments of the present disclosure.
Figure 6B:
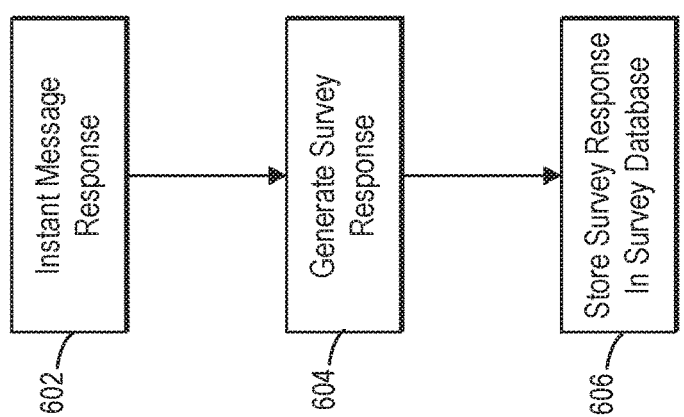
FIG. 6B illustrates a schematic flow diagram that an electronic survey system of the present disclosure may utilize to generate a survey response according to one or more embodiments of the present disclosure.
Figure 6A:
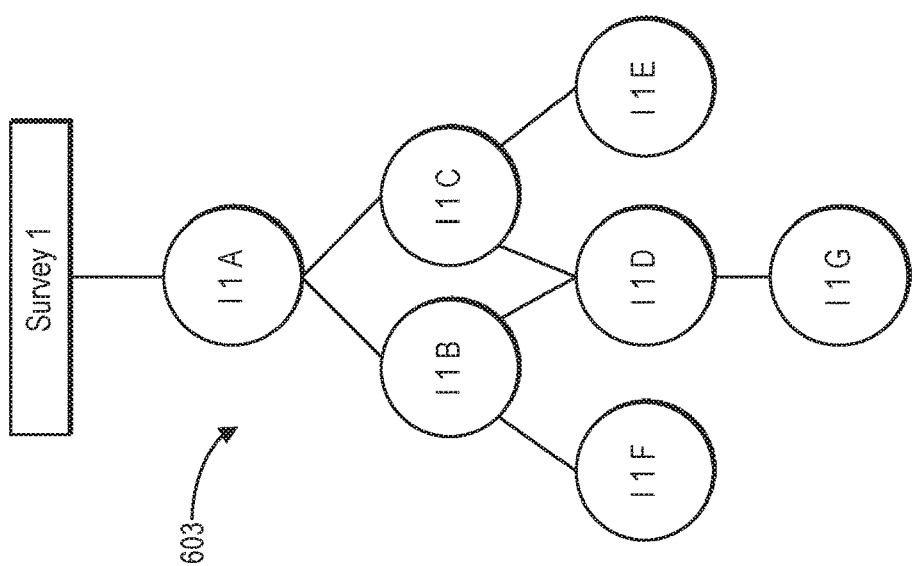
FIG. 6A illustrates a default tree structure of an example electronic survey according to one or more embodiments of the present disclosure.

As discussed above in regard to act 268 of FIG. 2F, in some embodiments, after receiving an instant message response, the survey system 108 can generate a survey response, and can store the survey response within the survey database 118 of the survey system 108. For example, FIG. 6A illustrates a default tree structure 603 of an example electronic survey. FIG. 6B illustrates a schematic flow diagram that a survey system 108 of the present disclosure may utilize to generate a survey response. FIG. 6C illustrates an example data table 608 within the survey database 118 where the survey system 108 may store the survey response and associate it with a respective survey inquiry.

Referring to FIGS. 6A-6C together, in operation, the survey system 108 can provide a survey inquiry (e.g., survey inquiry I1A), and in response to providing the survey inquiry, the survey system 108 can receive an instant message response from a user, as shown in box 602. Upon receiving the instant message response, the survey system 108 can perform any of the analysis described above in regard to acts 256-263 of FIG. 2E.

Furthermore, the survey system 108 can generate a survey response (e.g., survey response R1A) based on the instant message response and the analysis performed on the instant message response, as shown in box 604. In some embodiments, the survey system 108 can generate the survey response to indicate one or more of a meaning (e.g., sentiment) of the instant message response, keywords of the instant message response, a geolocation associated with the instant message response, a time associated with the instant message response, and a path traveled by the user (e.g., the client device 102). For example, the survey system 108 can generate a data package representing the survey response and including any of the foregoing data.

Moreover, the survey system 108 can store the survey response within the survey database 118 of the survey system 108, as shown in box 606. For example, the survey system 108 can store the data package representing the survey response within the survey database 118 of the survey system 108. Furthermore, the survey system 108 can associate the survey response (e.g., survey response R1A) with a respective survey inquiry (e.g., survey inquiry I1A) within the survey database 118 of the survey system 108. For instance, the survey system 108 can associate the survey response with the respective survey inquiry with the data table 608. In particular, the data table 608 can include an inquiry ID number column 610, as illustrated in FIG. 6C. Each inquiry ID number in the inquiry ID number column 610 references a particular survey inquiry. Furthermore, the data table 608 can include a response ID number column 612, as illustrated in FIG. 6C. Each response ID number in the response ID number column 612 references a particular survey response. As shown, if, based on the default tree structure 603 and received instant message responses, the survey system 108 does not provide a survey inquiry (e.g., I1B) to the user, and as a result, does not receive an instant message response to the survey inquiry, the survey system 108 does not associate any survey response with the survey inquiry within the data table 608.

As discussed above, in some embodiments, the survey system 108 can adjust survey inquiries based on detected keywords within instant message responses in order to identify a matching electronic survey to provide to a user. For example, FIG. 7 illustrates a schematic representation of a process of the survey system 108 modifying survey inquiries based detected keywords of instant message responses.

Figure 7:
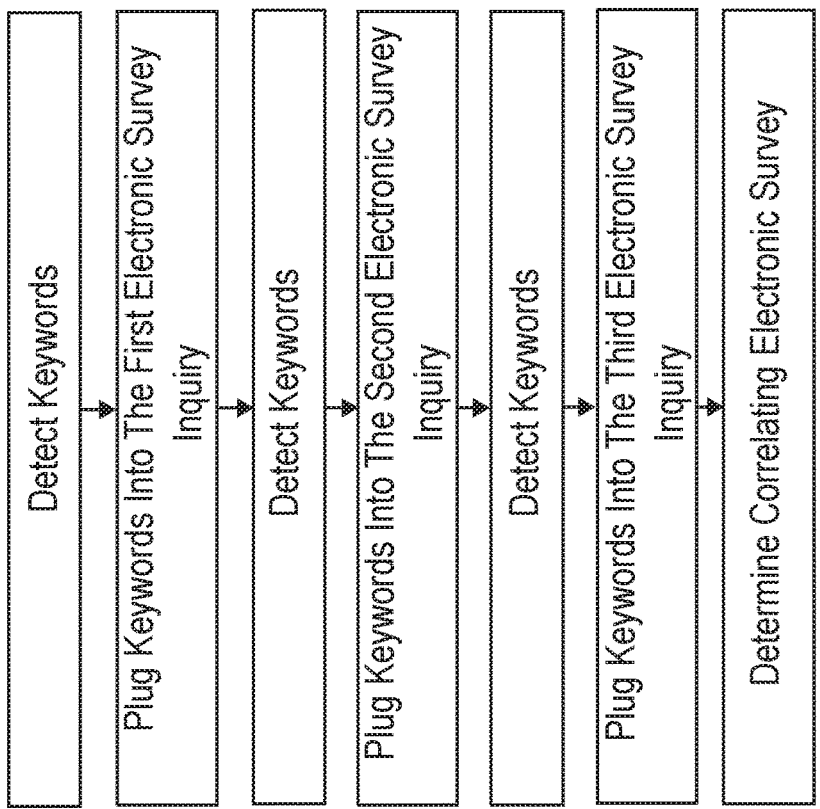
FIG. 7 illustrates a schematic representation of a process of an electronic survey system modifying survey inquiries based on detected keywords of instant message responses according to one or more embodiments of the present disclosure.
Figure 7:
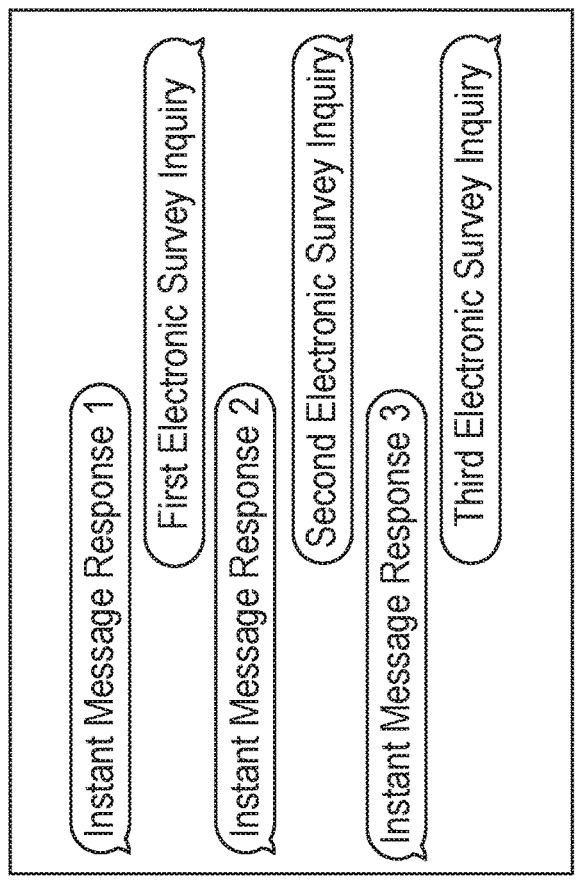

As shown in FIG. 7, the survey system 108 can receive an instant message response 1 from the user. In response to receiving the instant message response 1, the survey system 108 can detect keywords within the instant message response 1 via the keyword detection system described above in regard to act 258 of FIG. 2E. Furthermore, upon detecting keywords, the survey system 108 can adjust a customizable survey inquiry based on the detected keywords. For example, the survey system 108 can plug the detected keywords into the general survey inquiry. For instance, if the detected keywords include "price" and "shipping," the survey system 108 can adjust the customizable survey inquiry to recite "I understand that you are concerned about the price of shipping. Can you please explain your concern?" Upon modifying the customizable survey inquiry, the survey system 108 can provide the modified survey inquiry to the user as a first survey inquiry. For example, the survey system 108 can provide the first survey inquiry to the user in any of the manners described above in regard to acts 238 and 276 of FIGS. 2C and 2G.

In response to providing the first survey inquiry, the survey system 108 can receive an instant message response 2 from the user. For instance, the survey system 108 can receive the instant message response 2 from the user in any of the manners described above in regard to act 252 of FIG. 2D. Furthermore, the survey system 108 can detect keywords within the instant message response 2 via the keyword detection system. Moreover, upon detecting keywords, the survey system 108 can adjust an additional customizable survey inquiry based on the detected keywords. For instance, if the detected keywords include "shipping" and "too expensive," the survey system 108 can adjust an additional customizable survey inquiry to recite "I understand that you believe the cost of shipping was too expensive. Is that correct?" Upon modifying the additional customizable survey inquiry, the survey system 108 can provide the adjusted survey inquiry to the user as a second survey inquiry. For example, the survey system 108 can provide the second survey inquiry to the user in any of the manners described above in regard to acts 238 and 276 of FIGS. 2C and 2G.

In response to providing the second survey inquiry, the survey system 108 can receive an instant message response 3 from the user. For instance, the survey system 108 can receive the instant message response 3 from the user in any of the manners described above in regard to act 252 of FIG. 2D. Furthermore, the survey system 108 can detect keywords within the instant message response 3 via the keyword detection system. Furthermore, upon detecting keywords, the survey system 108 can adjust an additional customizable survey inquiry based on the detected keywords. Moreover, the survey system 108 can repeat the foregoing process as many times as is necessary to identify a matching electronic survey. For example, based on the detected keywords of any of the instant message responses 1, 2, and 3, the survey system 108 can determine a matching electronic survey.

Figure 8:
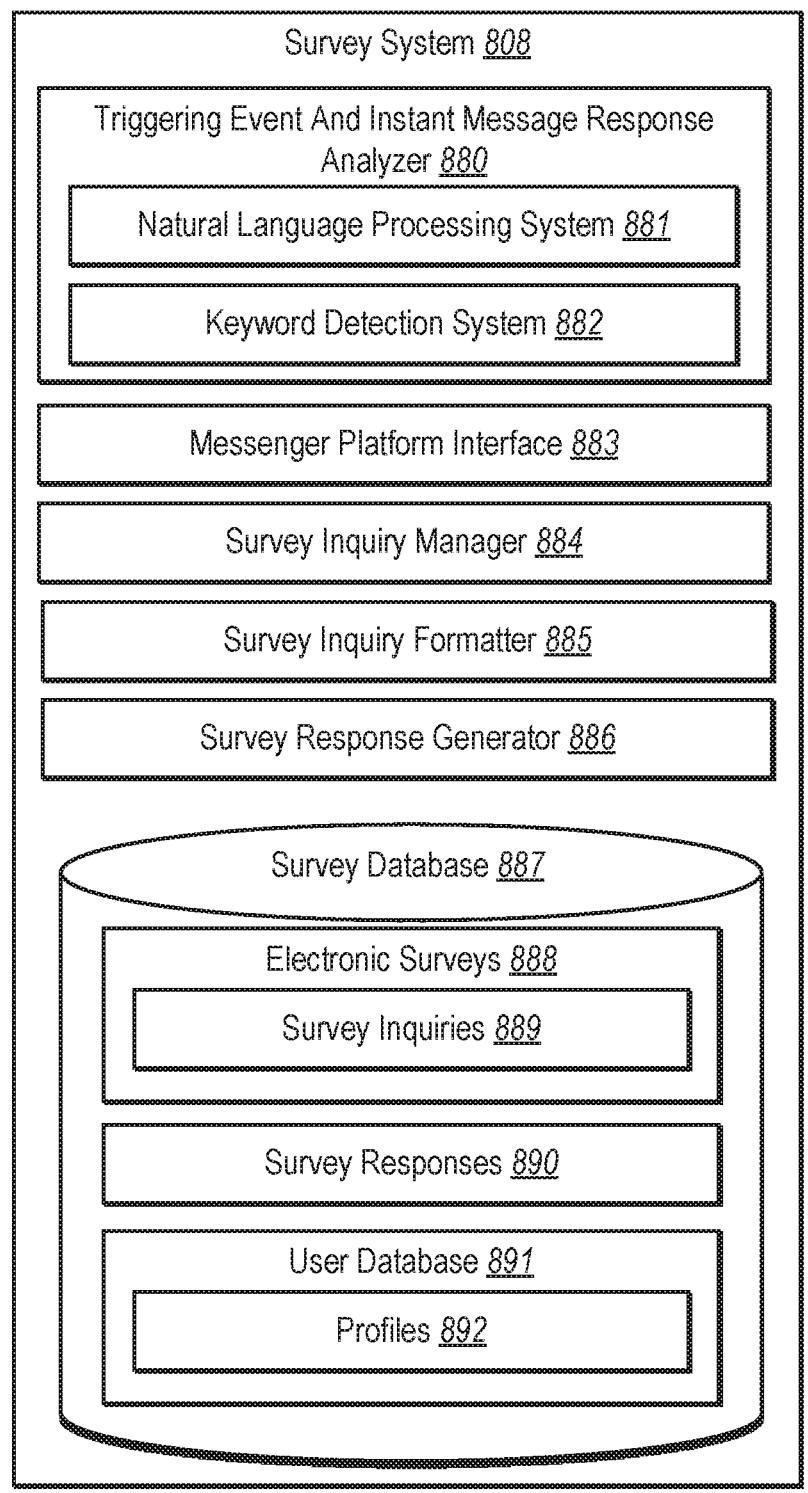
FIG. 8 illustrates a schematic diagram of an electronic survey system in accordance with one or more embodiments of the present disclosure.

FIG. 8 illustrates a schematic diagram of a survey system 808 in accordance with one or more embodiments. The survey system 808 may be an example embodiment of the survey system 108 described in connection with the survey system 808 of FIGS. 1-7. The survey system 808 can include various components for performing the processes and features described herein. For example, and as illustrated in FIG. 8, the survey system 808 includes a trigger event and instant message response analyzer 880, a messenger platform interface 883, a survey inquiry manager 884, a survey inquiry formatter 885, a survey response generator 886, and a survey database 887. In addition, the survey system 808 may include additional components not illustrated, such as those as described below. The various components of the survey system 808 may be in communication with each other using any suitable communication protocols, such as described with respect to FIG. 12 below.

Each component of the survey system 808 may be implemented using one or more computing devices (e.g., server devices 110) including at least one processor executing instructions that cause the survey system 808 to perform the processes described herein. The components of the survey system 808 can be implemented by a single server device 110 or across multiple server devices 110, as described above. Although a particular number of components are shown in FIG. 8, the survey system 808 can include more components or can combine the components into fewer components (such as a single component), as may be desirable for a particular implementation.

As briefly mentioned above, the survey system 808 includes a trigger event and instant message response analyzer 880. The trigger event and instant message response analyzer 880 can analyze trigger events and instant message response received from a user. For example, the trigger event and instant message response analyzer 880 can include a natural language processing ("NLP") system 881 and a keyword detection system 882. Utilizing the NLP system and/or the keyword detection system 882, the trigger event and instant message response analyzer 880 can determine meanings (e.g., sentiments) associated with trigger events and/or instant message responses and/or keywords within trigger events and/or instant message responses. Furthermore, the trigger event and instant message response analyzer 880 can determine geolocations and/or times associated with trigger events and/or instant message responses. For example, the trigger event and instant message response analyzer 880 can analyze trigger events and/or instant message response via any of the manners described above in regard to acts 220, 222 256, 258 of FIGS. 2B-2E and FIGS. 4-7.

As discussed briefly above, the survey system 808 further includes a messenger platform interface 883. Furthermore, the messenger platform interface 883 can interface with the messenger platform 120. For example, the messenger platform interface 883 can provide survey inquiries to the messenger platform 120 and can receive instant message responses from the messenger platform 120. For instance, the messenger platform interface 883 can provide survey inquiries to the messenger platform 120 and can receive instant message responses from the messenger platform 120 in any of the manners described above in regard to acts 238, 252, 276 of FIGS. 2C-2G.

Additionally, as noted above, the survey system 808 includes a survey inquiry manager 884. In one or more embodiments, the survey inquiry manager 884 can identify survey inquiries to provide to a user based on the analysis performed by the trigger event and instant message response analyzer 880. For example, the survey inquiry manager 884 can query the survey database 887 to identify survey inquiries to provide to the user. For instance, the survey inquiry manager 884 can identify survey inquiries via any of the manners described above in regard to acts 234 and 272 of FIGS. 2C and 2F.

Furthermore, as discussed above, the survey system 808 includes a survey inquiry formatter 885. The survey inquiry formatter 885 can format survey inquiries to be compatible with the messenger platform 120. For example, the survey inquiry formatter 885 can format the survey inquiries according to the set of routines, protocols, and tools of the messenger platform 120. In particular, the survey inquiry formatter 885 can format the survey inquiries according to any of the manners described above in regard to acts 236 and 274 of FIGS. 2C and 2G.

Moreover, as mentioned above, the survey system 808 includes a survey response generator 886. The survey response generator 886 can generate survey responses 890 based on received instant message responses and the analysis performed on the instant message response by the trigger event and instant message response analyzer 880. In some embodiments, the survey response generator 886 can generate the survey response 890 to indicate one or more of a meaning (e.g., sentiment) of the instant message response, keywords of the instant message response, a geolocation associated with the instant message response, and a time associated with the instant message response. For example, the survey response generator 886 can generate a data package representing the survey response 890.

Moreover, the survey response generator 886 can store the survey response 890 within the survey database 887 of the survey system 808. For example, the survey response generator 886 can store the data package representing the survey response 890 within the survey system 808. Furthermore, the survey response generator 886 can associate the survey response 890 with a respective survey inquiry within the survey database 887. For instance, the survey response generator 886 can associate the survey response 890 with the respective survey inquiry with the data table 608. In particular, the survey response generator 886 can store the survey response 890 within the survey database 887 of the survey system 808 in any of the manners described above in regard to FIGS. 6A-6C.

As mentioned above, the survey system 808 includes a survey database 887. The survey database 887 may include a single database or multiple databases. In addition, the survey database 887 may be located within the survey system 808. Alternatively, the survey database 887 may be external to the survey system 808, such as in cloud storage. Further, the survey database 887 may store and provide data and information to the survey system 808, as further described below and as described above in regard to FIGS. 2A-2G.

The survey database 887 may include electronic surveys 888, such as electronic surveys 888 provided to the survey system 808 from the third-party system 104. Moreover, the survey database 887 may include survey responses 890 generated from instant message response received by the survey system 808 and a user database 891 storing profiles 892 of users. In addition, the survey database 887 may store information about each electronic survey 888, such as parameters and preferences that correspond to each electronic survey 888.

Each electronic survey 888 may have a survey identifier number (or simply "survey ID number") to provide unique identification. In some cases, the electronic surveys 888 may be organized according to survey ID number. Alternatively, electronic surveys 888 in the survey database 887 may be organized according to other criteria, such as creation date, last modified date, closing time, most recent results, etc. Further, the survey database 887 may associate access codes with a survey ID number, such that the survey system 808 can identify to which electronic survey a response corresponds when the response includes an access code.

As shown in FIG. 8, the electronic surveys 888 of the survey database 887 may include survey inquiries 889. More specifically, each electronic survey 888 may include a set of potential survey inquiries. The survey system 808 may store the survey inquiries grouped by electronic survey. Further, each survey inquiry 889 may have a unique inquiry identifier number (or simply "inquiry ID number"). In some cases, the inquiry ID number may also identify the electronic survey 888 to which the survey inquiry 889 belongs. For example, all survey inquiries 889 from a particular electronic survey 888 may include the survey ID number within the inquiry ID number.

Further, each survey inquiry 889 may be associated with a survey response 890, or a compilation of survey responses 890. For example, when a user provides an instant message response to a survey inquiry 889, as discussed above, the survey system 808 generates a survey response 890 based on the instant message response and adds the survey response 890 to the survey database 887 and associates the survey response 890 with the respective survey inquiry 889. As such, the survey responses 890 may include a cumulative set of responses for a survey inquiry 889. Further, each survey response 890 may have a unique response identifier (or simply "response ID"). In some instances, the response ID may identify the electronic survey 888 and/or the survey inquiry 889 to which the survey response 890 corresponds. For instance, based on the response ID, the survey system 808 is able to identify the corresponding survey inquiry 889 and/or the electronic survey 888.

As mentioned briefly above, the survey database 887 may also include a user database 891 for storing profiles 892 of users. The user database 891 may include known information about users including, for example, age, gender, home address, telephone number, etc. Furthermore, the user database 891 may include a record of electronic surveys 888 and/or survey inquiries 889 completed by a user. Moreover, the user database 891 may include an indication of a geolocation where the user completed (e.g., provided an instant message response in reply to) each electronic survey 888 and/or survey inquiry 889 and an indication of geolocation where the user was located but did not complete electronic surveys.

Figure 9:
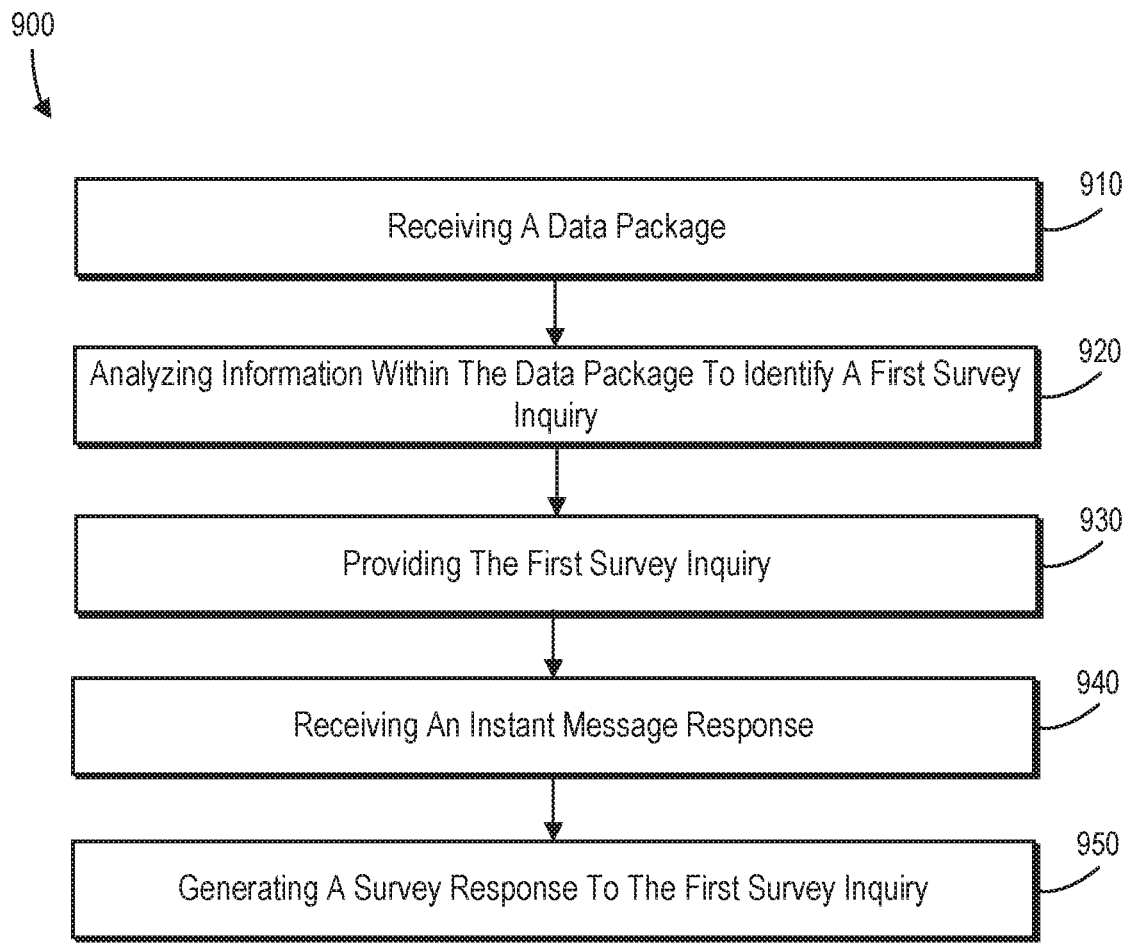
FIG. 9 illustrates a flowchart of one example method of generating a survey response based on an analysis of an instant message response provided by a user according to one or more embodiments of the present disclosure.

FIG. 9 illustrates a flowchart of one example method 900 of generating a survey response based on an analysis of a communication provided by a user. As shown in FIG. 9, the method 900 can involve an act 910 of receiving a data package. For example, act 910 can include receiving, at an electronic survey system, a data package from a third-party system based on the third-party system detecting a trigger event initiated by a user. In some instances, act 910 can further include comprises receiving a data package in response to the third-party system detecting one or more of a completed purchase by a user, a cancelation of a purchase by a user, and a user initiated message to the third-party system. Moreover, act 910 can include receiving an indication that the user interacted with the hyperlink. Additionally, act 910 can include any of the actions described above in regard to act 216 of FIG. 2A.

Additionally, the method 900 involves an act 920 of analyzing information within the data package to identify a first survey inquiry. In particular, act 920 can include analyzing, by at least one processor, information within the data package to identify a first survey inquiry corresponding to a first electronic survey maintained within the electronic survey system. In some embodiments, act 920 can include analyzing the data package to determine at least one of a user identification for the user, a user input, or an event type. Furthermore, act 920 can include selecting the first survey inquiry from a first set of survey inquiries within the first electronic survey. Moreover, act 920 can include any of the actions described above in regard to act 218 of FIG. 2B.

Method 900 can also involve an act 930 of providing the first survey inquiry within an instant messenger communication thread. For example, act 930 can include, providing, via an instant messenger platform, the first survey inquiry for presentation to the user within an instant messenger communication thread associated with the user. Furthermore, act 930 can include providing the first survey inquiry to the third-party system, which causes the third-party system to provide the first survey inquiry to the instant messenger communication thread associated with the user. Moreover, act 930 can include any of the actions described above in regard to acts 238, 240, and 242 of FIG. 2C.

Furthermore, method 900 can involve an act 940 of receiving an instant message response. For instance, act 940 can include receiving, via the instant messenger platform, an instant message response input by the user into the instant messenger communication thread. In some embodiments, act 940 can include receiving an indication that the user interacted with the hyperlink. Also, act 940 can include any of the actions described above in regard to acts 252 of FIG. 2D.

Additionally, method 900 can involve an act 950 of generating a survey response to the first survey inquiry. In particular, act 950 can include, based on the instant message response, generating a survey response to the first survey inquiry corresponding to the first electronic survey within the electronic survey system. For instance, act 950 can include creating a record of the user interaction with a hyperlink. Likewise, act 950 can include any of the actions described above in regard to acts 268 and 270 of FIG. 2F.

Furthermore, in one or more embodiments, method 900 can involve converting the first survey inquiry from an electronic survey format to an instant messenger format, wherein providing the first survey inquiry to the instant messenger communication thread associated with the user comprises providing the first survey inquiry in the instant messenger format. Furthermore, in some embodiments, method 900 can include successively providing each survey inquiry of the first set of survey inquiries for presentation to the user within the instant messenger communication thread associated with the user. Additionally, in some instances, method 900 can include, based on the analysis of the data package sending a communication to the third-party system to initiate direct communication between the user and the third-party. Likewise, in one or more embodiments, method 900 includes determining that the instant message response is unrelated to the first electronic survey, determining that the instant message response is related to a second electronic survey within the electronic survey system, identifying a second survey inquiry within the second electronic survey, formatting the second survey inquiry in the instant messenger format, and providing, via the instant messenger platform, the formatted second survey inquiry to the instant messenger communication thread associated with the user.

Figure 10:
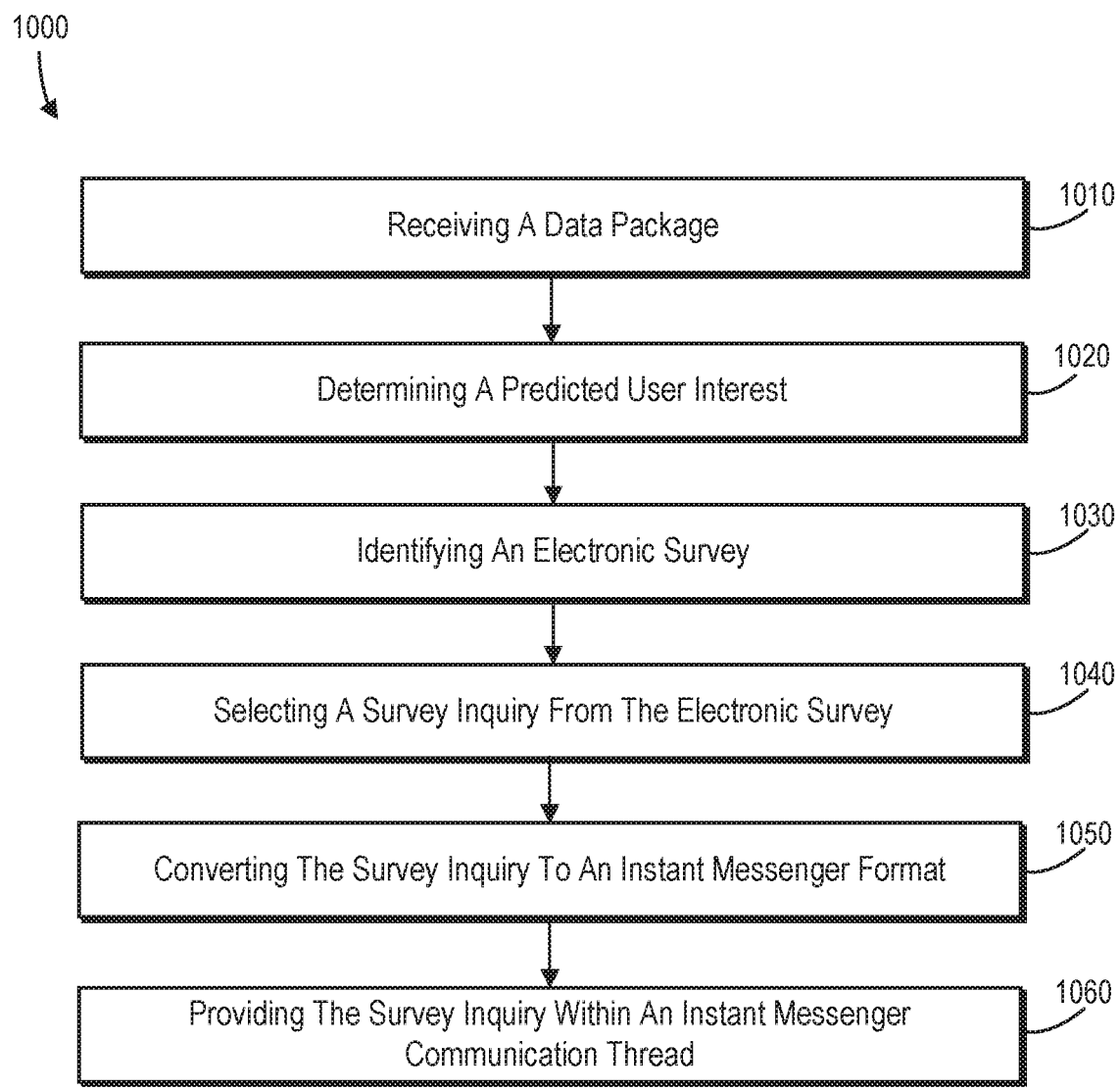
FIG. 10 illustrates a flowchart of another example method of generating a survey response based on an analysis of an instant message response provided by a user according to one or more embodiments of the present disclosure.

FIG. 10 illustrates a flowchart of one example method 1000 of generating a survey response based on an analysis of a communication provided by a user. As shown in FIG. 10, the method 1000 can involve an act 1010 of receiving a data package. For example, act 1010 can include receiving, from a third-party system, a data package sent in response to the third-party system detecting a trigger event initiated by a user on a client device associated with the user. In some instances, act 1010 can further include receiving the data package in response to the third-party system detecting one or more of a completed purchase, a cancelation of a purchase, or an initiated message associated with the user. Additionally, act 1010 can include any of the actions described above in regard to act 216 of FIG. 2A.

Additionally, the method 1000 involves an act 1020 of determining a predicted user interest. For example, act 1020 can include determining a predicted user interest based on information within the data package. In some embodiments, act 1020 can include determining the predicted user interest is based at least in part on the one or more keywords. Moreover, act 1020 can include any of the actions described above in regard to act 218 of FIG. 2B.

Method 1000 can also involve an act 1030 of identifying an electronic survey. For example, act 1030 can include, based on the predicted user interest, identifying, within an electronic survey system, an electronic survey comprising one or more survey inquiries corresponding to the predicted user interest. Moreover, act 1030 can include any of the actions described above in regard to acts 234 and 236 of FIG. 2C.

Additionally, method 1000 can involve an act 1040 of selecting a survey inquiry from the electronic survey. For example, act 1040 can include selecting a survey inquiry from the one or more survey inquiries of the electronic survey. Moreover, act 1040 can include any of the actions described above in regard to acts 234 and 236 of FIG. 2C.

Furthermore, method 1000 can involve an act 1050 of converting the survey inquiry to an instant messenger format. For instance, act 1050 can include converting the survey inquiry from an electronic survey format to an instant messenger format. Also, act 1040 can include any of the actions described above in regard to acts 236 and 274 of FIGS. 2C and 2G.

Moreover, method 1000 can involve an act 1060 of providing the survey inquiry within an instant messenger communication thread. For example, act 1050 can include providing, via an instant messenger platform, the survey inquiry for presentation within an instant messenger communication thread on the client device associated with the user. Furthermore, act 1050 can include any of the actions described above in regard to acts 238 and 276 of FIGS. 2C and 2G.

Furthermore, in one or more embodiments, method 1000 can involve determining the data package comprises text that was input by the user and analyzing the text with a natural language processing system to identify one or more keywords. Furthermore, in some embodiments, method 1000 can include generating a survey response to the survey inquiry based on receiving, via the instant messenger platform, an instant message response input by the user into the instant messenger communication thread and associating the survey response with the electronic survey within the electronic survey system. Additionally, in some instances, method 1000 can include associating the electronic survey with a survey ID and the survey inquiry with an inquiry ID, determining the instant message response corresponds to the survey ID and the inquiry ID, and wherein associating the survey response with the electronic survey within the electronic survey system is based on the determination that the instant message response corresponds to the survey ID and the inquiry ID. Likewise, in one or more embodiments, method 1000 includes receiving, via the instant messenger platform, an instant message response input by the user into the instant messenger communication thread, converting the instant message response from the instant messenger format to the electronic survey format to generate an electronic survey message response compatible with the electronic survey system, and analyzing the electronic survey message response to generate a survey response corresponding to the survey inquiry of the electronic survey.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
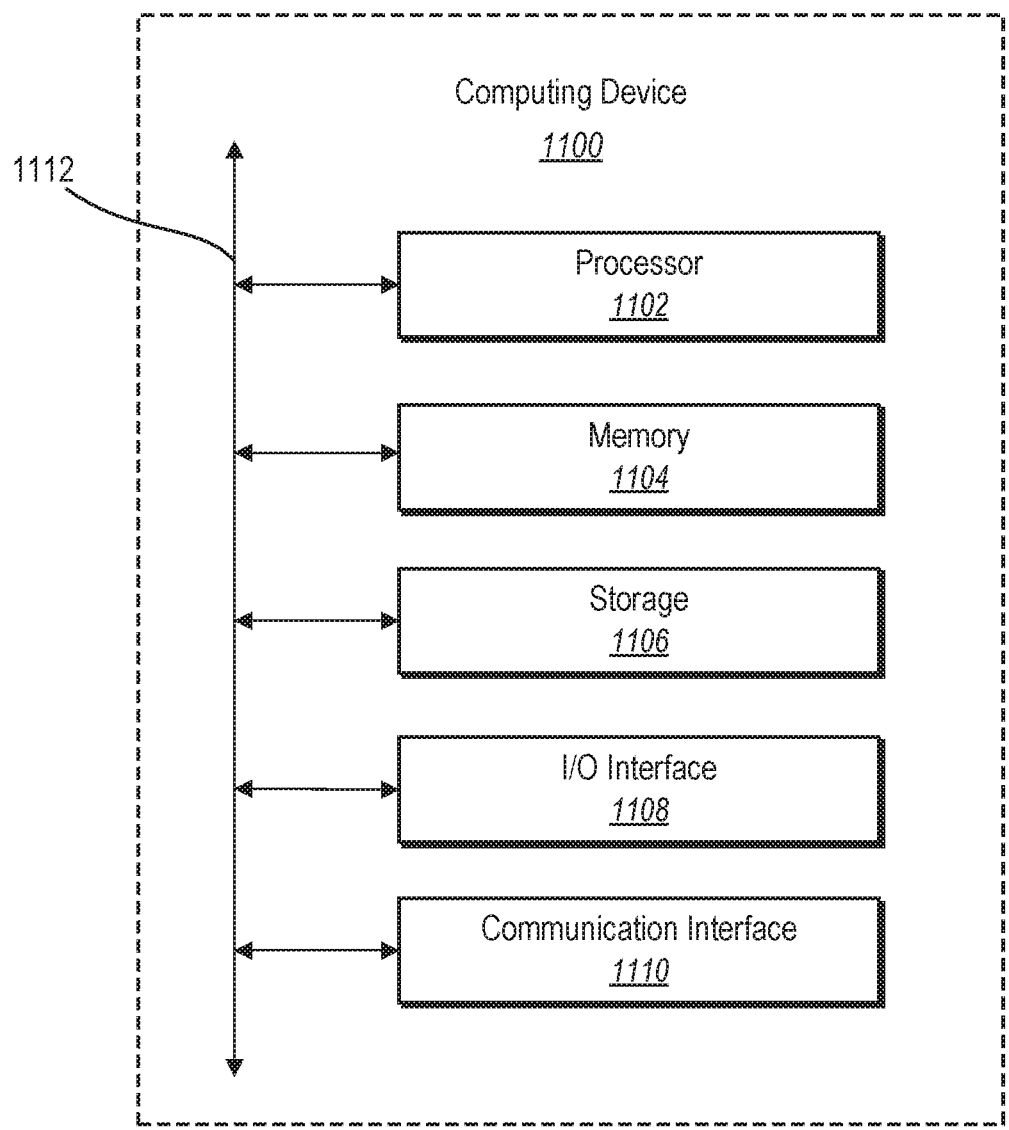
FIG. 11 illustrates a block diagram of an example computing device in accordance with one or more embodiments.

FIG. 11 illustrates a block diagram of an example computing device 1100 that may be configured to perform one or more of the processes described above. One will appreciate that one or more computing devices such as the computing device 1100 may implement the survey system 108, client device 102, and/or third-party system 104 described above. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. While an example computing device 1100 is shown in FIG. 11, the components illustrated in FIG. 11 are not intended to be limiting. Additional or alternative components may be used in other embodiments. Furthermore, in certain embodiments, the computing device 1100 can include fewer components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions, the processor 1102 may retrieve (or fetch) the instructions from an internal register, an internal cache, the memory 1104, or the storage device 1106 and decode and execute them. In one or more embodiments, the processor 1102 may include one or more internal caches for data, instructions, or addresses. As an example and not by way of limitation, the processor 1102 may include one or more instruction caches, one or more data caches, and one or more translation look aside buffers (TLBs). Instructions in the instruction caches may be copies of instructions in the memory 1104 or the storage 1106.

The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The storage device 1106 includes storage for storing data or instructions. As an example and not by way of limitation, storage device 1106 can comprise a non-transitory storage medium described above. The storage device 1106 may include a hard disk drive (HDD), a floppy disk drive, flash memory, an optical disc, a magneto-optical disc, magnetic tape, or a Universal Serial Bus (USB) drive or a combination of two or more of these. The storage device 1106 may include removable or non-removable (or fixed) media, where appropriate. The storage device 1106 may be internal or external to the computing device 1100. In one or more embodiments, the storage device 1106 is non-volatile, solid-state memory. In other embodiments, the storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1112 may include hardware, software, or both that couples components of the computing device 1100 to each other. As an example and not by way of limitation, the communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 12:
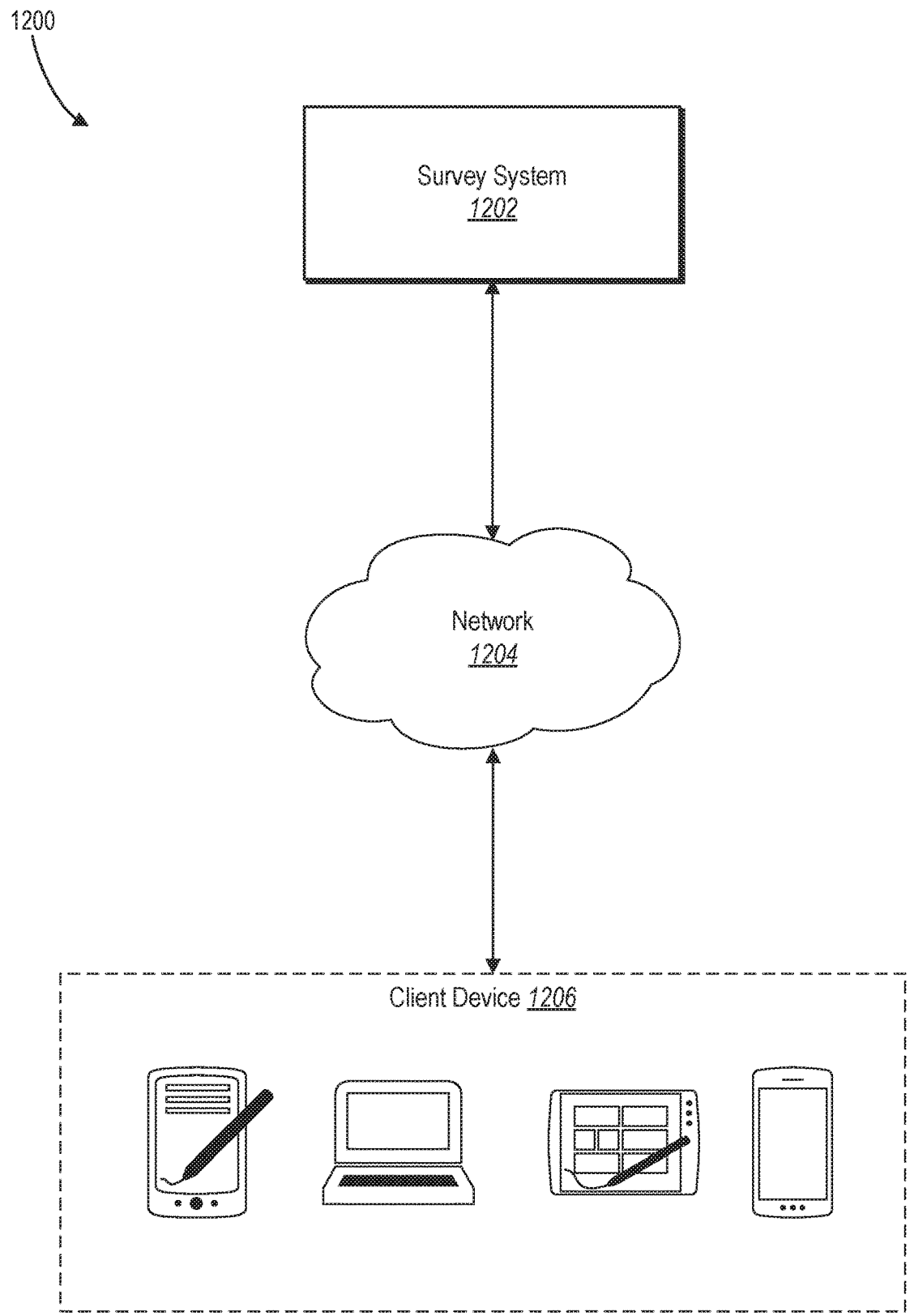
FIG. 12 is an example network environment of a survey system in accordance with one or more embodiments.

FIG. 12 illustrates an example network environment 1200 of a survey system 1202. Network environment 1200 includes a client system 1206, and a survey system 1202 connected to each other by a network 1204. Although FIG. 12 illustrates a particular arrangement of client system 1206, survey system 1202, and network 1204, this disclosure contemplates any suitable arrangement of client system 1206, survey system 1202, and network 1204. As an example and not by way of limitation, two or more of client system 1206, and survey system 1202 may be connected to each other directly, bypassing network 1204. As another example, two or more of client system 1206 and survey system 1202 may be physically or logically co-located with each other in whole, or in part. Moreover, although FIG. 12 illustrates a particular number of client systems 1206, survey systems 1202, and networks 1204, this disclosure contemplates any suitable number of client systems 1206, survey systems 1202, and networks 1204. As an example and not by way of limitation, network environment 1200 may include multiple client system 1206, survey systems 1202, and networks 1204.

This disclosure contemplates any suitable network 1204. As an example and not by way of limitation, one or more portions of network 1204 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1204 may include one or more networks 1204.

Links may connect client system 1206, and survey system 1202 to communication network 1204 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links may differ in one or more respects from one or more second links.

In particular embodiments, client system 1206 may be an electronic device including hardware, software, or embedded logic components or a combination of two or more such components and capable of carrying out the appropriate functionalities implemented or supported by client system 1206. As an example and not by way of limitation, a client system 1206 may include any of the computing devices discussed above in relation to FIG. 5. A client system 1206 may enable a network user at client system 1206 to access network 1204. A client system 1206 may enable its user to communicate with other users at other client systems 1206.

In particular embodiments, client system 1206 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client system 1206 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client system 1206 one or more Hyper Text Markup Language (HTML) files responsive to the HTTP request. Client system 1206 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, survey system 1202 may include a variety of servers, sub-systems, programs, modules, logs, and data stores. In particular embodiments, survey system 1202 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Survey system 1202 may also include suitable components such as network interfaces, security mechanisms, load balancers, failover servers, management-and-network-operations consoles, other suitable components, or any suitable combination thereof.

In particular embodiments, survey system 1202 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., users 110, customers, etc.).

The foregoing specification is described with reference to specific example embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this invention. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and legal equivalents.

What is claimed is:

1. A computer-implemented method comprising:
   receiving, from a third-party system and at an electronic survey system, a data package comprising one or more attributes of a trigger event detected on the third-party system, the data package received based on a user action of a user on the third-party system;
   in response to receiving the data package:
   analyzing, by at least one processor, the one or more attributes of the trigger event within the data package to determine a user interest based on the user action on the third-party system;
   querying a survey database within the electronic survey system to identify a first survey inquiry that matches the user interest, the first survey inquiry associated with a plurality of defined potential survey responses, wherein the plurality of defined potential survey responses comprise pre-defined answers to the first survey inquiry;
   analyzing an electronic survey with a tree generation engine to determine a tree structure for administering the electronic survey; and
   providing, via an instant messenger platform, the electronic survey comprising the first survey inquiry for presentation to the user based on the determined tree structure within an instant messenger communication thread associated with the user;
   receiving, via the instant messenger platform, an instant message response comprising natural language input by the user into the instant messenger communication thread;
   analyzing the instant message response to select a defined survey response from the plurality of defined potential survey responses by determining that the natural language of the instant message response correlates to the defined survey response, wherein the instant message response input by the user is different from the defined survey response;
   providing, to the survey database, the selected defined survey response;
   generating a survey results report comprising an indication of the selected defined survey response; and
   providing, to a client device associated with a survey administrator, the survey results report.

2. The computer-implemented method of claim 1, further comprising:
   utilizing the tree generation engine to determine inquiry types of survey inquiries of the electronic survey;
   based on the inquiry types of the survey inquiries, generating the tree structure; and
   based on the inquiry types of the survey inquiries, determining one or more types of analysis for the instant message response.

3. The computer-implemented method of claim 1, further comprising converting the first survey inquiry from an electronic survey format to an instant messenger format, wherein providing the first survey inquiry to the instant messenger communication thread associated with the user comprises providing the first survey inquiry in the instant messenger format.

4. The computer-implemented method of claim 3, wherein converting the first survey inquiry from the electronic survey format to in the instant messenger format comprises modifying the first survey inquiry to comprise natural messenger language utilizing a natural language processor.

5. The computer-implemented method of claim 1, further comprising:
   determining that the instant message response is unrelated to any of the plurality of defined potential survey responses;

identifying, based on the instant message response, a second survey inquiry within the electronic survey system; and providing, via the instant messenger platform, the second survey inquiry for presentation within the instant messenger communication thread associated with the user.

6. The computer-implemented method of claim 1, wherein analyzing the one or more attributes of the trigger event within the data package further comprises determining at least one of a user identification for the user, a user input, or an event type.

7. The computer-implemented method of claim 1, further comprising:
determining, based on the one or more attributes of the trigger event within the data package, a user identifier corresponding to the user action for the instant messenger platform; and
utilizing the user identifier to provide the first survey inquiry for presentation to the user within the instant messenger communication thread.

8. The computer-implemented method of claim 1, wherein:
determining a hyperlink corresponding to third-party content on the third-party system relates to the one or more attributes of the trigger event within the data package;
providing the hyperlink corresponding to the third-party content as part of the first survey inquiry;
receiving the instant message response comprises receiving an indication that the user interacted with the hyperlink; and
generating the survey results report comprising the indication of the selected defined survey response comprises creating a record of the user interaction with the hyperlink.

9. The computer-implemented method of claim 1, wherein identifying the first survey inquiry comprises selecting the first survey inquiry from a first set of survey inquiries within the survey database.

10. The computer-implemented method of claim 9, further comprising successively providing each survey inquiry of the first set of survey inquiries for presentation to the user within the instant messenger communication thread associated with the user.

11. The computer-implemented method of claim 1, further comprising, based on analyzing the one or more attributes of the trigger event of the data package, sending a communication to the third-party system to initiate direct communication between the user and the third-party system.

12. A non-transitory computer-readable medium storing instructions that, when executed by at least one processor, cause a computer device to:
receive, from a third-party system and at an electronic survey system, a data package comprising one or more attributes of a trigger event detected on the third-party system, the data package received based on a user action of a user on the third-party system;
in response to receiving the data package:
analyze the one or more attributes of the trigger event within the data package to determine a user interest based on the user action on the third-party system;
query a survey database within the electronic survey system to identify a first survey inquiry that matches the user interest, the first survey inquiry associated with a plurality of defined potential survey responses, wherein the plurality of defined potential survey responses comprise pre-defined answers to the first survey inquiry;
analyze an electronic survey with a tree generation engine to determine a tree structure for administering the electronic survey; and
provide, via an instant messenger platform, the electronic survey comprising the first survey inquiry for presentation to the user based on the determined tree structure within an instant messenger communication thread associated with the user;
receive, via the instant messenger platform, an instant message response comprising natural language input by the user into the instant messenger communication thread;
analyze the instant message response to select a defined survey response from the plurality of defined potential survey responses by determining that the natural language of the instant message response correlates to the defined survey response, wherein the instant message response input by the user is different from the defined survey response;
provide, to the survey database, the selected defined survey response;
generate a survey results report comprising an indication of the selected defined survey response; and
provide, to a client device associated with a survey administrator, the survey results report.

13. The non-transitory computer-readable medium of claim 12, wherein providing the first survey inquiry for presentation within the instant messenger communication thread associated with the user comprises providing the first survey inquiry to the third-party system, which causes the third-party system to provide the first survey inquiry to the instant messenger communication thread associated with the user.

14. The non-transitory computer-readable medium of claim 12, further comprising instructions that, when executed by the at least one processor, cause the computer device to convert the first survey inquiry from an electronic survey format to an instant messenger format, wherein providing the first survey inquiry to the instant messenger communication thread associated with the user comprises providing the first survey inquiry in the instant messenger format.

15. The non-transitory computer-readable medium of claim 14, wherein converting the first survey inquiry from the electronic survey format to in the instant messenger format comprises modifying the first survey inquiry to comprise natural language utilizing a natural language processor.

16. A system comprising:
at least one processor; and
at least one non-transitory computer-readable storage medium storing instructions that, when executed by the at least one processor, cause the system to:
receive, from a third-party system and at an electronic survey system, a data package comprising one or more attributes of a trigger event detected on the third-party system, the data package received based on a user action of a user on the third-party system;
in response to receiving the data package:
analyze the one or more attributes of the trigger event within the data package to determine a user interest based on the user action on the third-party system;
query a survey database within the electronic survey system to identify a first survey inquiry that matches the user interest, the first survey inquiry associated with a plurality of defined potential survey responses, wherein the plurality of defined potential survey responses comprise pre-defined answers to the first survey inquiry;

analyze an electronic survey with a tree generation engine to determine a tree structure for administering the electronic survey; and provide, via an instant messenger platform, the electronic survey comprising the first survey inquiry for presentation to the user based on the determined tree structure within an instant messenger communication thread associated with the user;

provide, via an instant messenger platform, the first survey inquiry for presentation to the user within an instant messenger communication thread associated with the user;

receive, via the instant messenger platform, an instant message response comprising natural language input by the user into the instant messenger communication thread;

analyze the instant message response to select a defined survey response from the plurality of defined potential survey responses by determining that the natural language of the instant message response correlates to the defined survey response, wherein the instant message response input by the user is different from the defined survey response;

provide, to the survey database, the selected defined survey response;

generate a survey results report comprising an indication of the selected defined survey response; and provide, to a client device associated with a survey administrator, the survey results report.

17. The system of claim 16, further comprising instructions that, when executed by the at least one processor, cause the system to:

determine that the instant message response is unrelated to any of the plurality of defined potential survey responses;

identify, based on the instant message response, a second survey inquiry within the electronic survey system; and provide, via the instant messenger platform, the second survey inquiry for presentation within the instant messenger communication thread associated with the user.

18. The system of claim 16, wherein analyzing the one or more attributes of the trigger event within the data package comprises determining at least one of a user identification for the user, a user input, or an event type.

19. The system of claim 16, wherein identifying the first survey inquiry comprises selecting the first survey inquiry from a first set of survey inquiries within the survey database.

20. The system of claim 16, further comprising instructions that, when executed by the at least one processor, cause the system to, based on analyzing the one or more attributes of the trigger event of the data package, send a communication to the third-party system to initiate direct communication between the user and the third-party system.

* * * * *